US008425027B2

(12) United States Patent
Nishiwaki et al.

(10) Patent No.: US 8,425,027 B2
(45) Date of Patent: Apr. 23, 2013

(54) CLEAR INK, INK JET RECORDING METHOD, INK SET, INK CARTRIDGE, RECORDING UNIT AND INK JET RECORDING APPARATUS

(75) Inventors: Yuko Nishiwaki, Mitaka (JP); Yoshio Nakajima, Yokohama (JP); Yuhei Shimizu, Kawasaki (JP); Tetsu Iwata, Yokohama (JP); Katsuhiro Hayashi, Yokohama (JP); Kenji Nishiguchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 381 days.

(21) Appl. No.: 12/815,961

(22) Filed: Jun. 15, 2010

(65) Prior Publication Data

US 2011/0001775 A1 Jan. 6, 2011

(30) Foreign Application Priority Data

Jul. 2, 2009 (JP) .................................. 2009-157470

(51) Int. Cl.
*B41J 2/17* (2006.01)
*G01D 11/00* (2006.01)

(52) U.S. Cl.
USPC .................. 347/98; 347/95; 347/96; 347/100

(58) Field of Classification Search ............... 347/100, 347/95, 96, 101, 105, 21, 9, 20, 98; 106/31.6, 106/31.27, 31.13; 523/160, 161
See application file for complete search history.

(56) References Cited

U.S. PATENT DOCUMENTS

| 5,786,420 | A | * | 7/1998 | Grandhee ......................... 525/7 |
| 6,074,052 | A | | 6/2000 | Inui et al. |
| 6,794,425 | B1 | * | 9/2004 | Ellis et al. ..................... 523/160 |
| 6,830,329 | B2 | | 12/2004 | Iwata |
| 6,858,301 | B2 | | 2/2005 | Ganapathiappan |
| 6,877,850 | B2 | | 4/2005 | Ishimoto et al. |
| 6,877,851 | B2 | | 4/2005 | Watanabe |
| 7,060,740 | B2 | | 6/2006 | Kataoka et al. |

(Continued)

FOREIGN PATENT DOCUMENTS

| EP | 1 391 301 A1 | 2/2004 |
| EP | 1 435 380 A1 | 7/2004 |

(Continued)

OTHER PUBLICATIONS

Oct. 6, 2010 European Search Report in European Patent Appln. No. 10006423.7.

*Primary Examiner* — Manish S Shah
(74) *Attorney, Agent, or Firm* — Fitzpatrick, Cella, Harper & Scinto

(57) ABSTRACT

Provided is an ink jet clear ink containing a polymer fine particle. The polymer fine particle has a core-shell structure obtained by polymerizing an α,β-ethylenically unsaturated hydrophobic monomer (b) as a core polymer in the presence of a shell polymer that is a copolymer having at least a unit derived from an α,β-ethylenically unsaturated hydrophobic monomer (a) and a unit derived from a monomer selected from an α,β-ethylenically unsaturated acid monomer and a salt thereof. The α,β-ethylenically unsaturated hydrophobic monomer (b) includes at least a monomer containing a chain structure saturated alkyl group.

20 Claims, 6 Drawing Sheets

U.S. PATENT DOCUMENTS

| | | |
|---|---|---|
| 7,208,032 B2 | 4/2007 | Hakamada et al. |
| 7,276,112 B2 | 10/2007 | Tokuda et al. |
| 7,291,211 B2 | 11/2007 | Kaneko et al. |
| 7,291,214 B2 | 11/2007 | Tsuji et al. |
| 7,297,202 B2 | 11/2007 | Ichinose et al. |
| 7,378,459 B2 | 5/2008 | Nishiguchi |
| 7,402,200 B2 | 7/2008 | Imai et al. |
| 7,517,074 B2 | 4/2009 | Hakamada et al. |
| 7,578,876 B2 | 8/2009 | Nakajima et al. |
| 7,629,395 B2 | 12/2009 | Nishiguchi et al. |
| 7,705,071 B2 | 4/2010 | Nakagawa et al. |
| 7,723,403 B2 | 5/2010 | Nishiwaki et al. |
| 2003/0087991 A1* | 5/2003 | Engel et al. .............. 523/201 |
| 2003/0189626 A1 | 10/2003 | Kataoka et al. |
| 2004/0032473 A1 | 2/2004 | Ishimoto et al. |
| 2004/0092621 A1 | 5/2004 | Kataoka et al. |
| 2004/0131855 A1* | 7/2004 | Ganapathiappan .......... 428/407 |
| 2004/0212667 A1 | 10/2004 | Nishiguchi |
| 2004/0239738 A1 | 12/2004 | Watanabe |
| 2008/0136875 A1 | 6/2008 | Iwata et al. |
| 2008/0139740 A1 | 6/2008 | Nishiwaki et al. |
| 2008/0146723 A1 | 6/2008 | Nishiwaki et al. |
| 2008/0252708 A1 | 10/2008 | Hakamada et al. |
| 2008/0269407 A1 | 10/2008 | Nishiguchi et al. |
| 2008/0292793 A1 | 11/2008 | Yamashita et al. |
| 2008/0292794 A1 | 11/2008 | Sato et al. |
| 2009/0258145 A1 | 10/2009 | Mukae et al. |
| 2010/0075046 A1 | 3/2010 | Hakamada et al. |
| 2010/0086686 A1 | 4/2010 | Nishiguchi et al. |
| 2010/0086687 A1 | 4/2010 | Hayashi et al. |
| 2010/0886688 | 4/2010 | Nishiguchi et al. |

FOREIGN PATENT DOCUMENTS

| | | | |
|---|---|---|---|
| JP | 2003-268275 A | | 9/2003 |
| JP | 2003-335058 A | | 11/2003 |
| JP | 2004059622 A | * | 2/2004 |
| JP | 2004-211089 A | | 7/2004 |
| JP | 2007-276482 A | | 10/2007 |
| JP | 2008-179778 A | | 8/2008 |

* cited by examiner

CLEAR INK, INK JET RECORDING METHOD, INK SET, INK CARTRIDGE, RECORDING UNIT AND INK JET RECORDING APPARATUS

BACKGROUND OF THE INVENTION

1. Field of the Invention

The present invention relates to a clear ink, an ink jet recording method, an ink set, an ink cartridge, a recording unit and an ink jet recording apparatus.

2. Description of the Related Art

With the advancement of the ink jet recording technology in recent years, it has been possible to relatively easily and cheaply record such a high-definition image having high gloss brightness as realized in silver salt photography or offset printing even in ordinary homes.

When a dye ink containing a dye as a coloring material is used for realizing high gloss brightness, a good image free of graininess is obtained. On the other hand, however, the image involves a problem that fastness properties such as light fastness, water fastness and gas fastness are poor. Therefore, a pigment ink containing a pigment as a coloring material has come to be used in recent years. As such a pigment ink, is widely used a pigment ink with a pigment dispersed with a water-soluble polymer for the purpose of more improving fixability of the pigment to a recording medium and fastness properties of the resulting image, such as scratch resistance.

In recent years, it has been performed to record an image with plural pigment inks that have the same hue as each other and are different in the content of a coloring material for providing an image of high quality comparable with or superior to a silver salt photograph. However, when an image is recorded with such plural pigment inks, particularly, an ink relatively high in the content of the pigment (deep-color ink) and an ink relatively low in the content of the pigment (light-color ink), the resulting image involves problems that lowering of uniformity of gloss brightness and variability of gloss clarity result from differences in gloss brightness and smoothness by the kind of inks occur.

In order to solve such problems of lowering of the uniformity of gloss brightness and variability of the gloss clarity, various attempts have heretofore been made. For example, it has been proposed that when an ink is recorded with a deep-color ink and a light-color ink, the acid value of a polymer used in the deep-color ink is made lower than the acid value of a polymer used in the light-color ink (see Japanese Patent Application Laid-Open No. 2003-268275). It has also been proposed that a pigment ink and a clear ink containing polymer particles are applied to a recording medium, and the amounts of the pigment ink and clear ink ejected are controlled in such a manner that the gloss brightness on the whole surface of the recording medium becomes substantially uniform (see Japanese Patent Application Laid-Open No. 2003-335058).

It has further been proposed that polymer particles having a cross-linked core-shell structure are used as a polymer contained in a clear ink (see Japanese Patent Application Laid-Open No. 2008-179778). An ink set of a clear ink containing acrylic polymer fine particles and a pigment ink has also been proposed (see Japanese Patent Application Laid-Open No. 2007-276482).

It has further been proposed that polymer particles of a core-shell structure are caused to be contained in an ink containing a colorant, thereby improving smear resistance (Japanese Patent Application Laid-Open No. 2004-211089). In the polymer particles, acrylic esters of an alcohol having 1 to 50 carbon atoms and a substituted alcohol are used as hydrophobic monomers. Herein, it is described that the polymer particles are obtained by forming a core by general seed polymerization, then further applying a monomer to the core to form a shell and conducting cross-linking.

SUMMARY OF THE INVENTION

As a result of an investigation by the present inventors, however, it has been found that the above-described prior art involves the following problems. First, in the invention described in Japanese Patent Application Laid-Open No. 2003-268275, amounts of the polymers coming to exist on the surface of a recording medium in respective regions recorded with the light-color ink and the deep-color ink are set close to each other. However, since the gloss clarity of an image recorded with the deep-color ink is low, its smoothness does not become high to the extent of an image recorded with the light-color ink, and so sufficient uniformity of gloss brightness is not achieved.

In the polymer fine particles described in Japanese Patent Application Laid-Open No. 2003-335058, the particle size thereof is difficult to be sufficiently enlarged, and so the particles are hard to remain on the surface of the recording medium. Accordingly, the effect of using the polymer is scarcely exhibited, and gloss brightness is not achieved. In addition, the polymer fine particles do not have a shell polymer, so that dispersion stability is liable to be insufficient, and long-term ejection stability is not achieved.

The cross-linked polymer particles described in Japanese Patent Application Laid-Open Nos. 2008-179778 and 2004-211089 are difficult to be made fine, and so ejection stability is not achieved. Although gloss brightness is achieved to some extent, both core polymer and shell polymer have a cross-linked structure, so that the polymer particles become rigid, the film-forming ability of the polymer particles becomes low, and good gloss clarity is not achieved.

The present inventors have carried out an investigation as to images obtained by such ink sets of a clear ink containing the acrylic fine particles and a pigment ink as described in Examples of Japanese Patent Application Laid-Open No. 2007-276482. As a result, uniformity of gloss brightness represented by a 20° gloss value has been certainly improved, but good gloss clarity has been unable to be achieved.

The polymer particles described in Japanese Patent Application Laid-Open No. 2004-211089 also have a core-shell structure. However, the polymer particles are used as a dispersant for pigment, not as a polymer added to a clear ink. In addition, the polymer particles may have uneven cores or may form undefined aggregates in some cases, so that dispersion stability in the ink is also insufficient. Even if such polymer particles are used in a clear ink, ejection stability necessary for an ink jet clear ink is not achieved.

Accordingly, it is an object of the present invention to provide a clear ink which is excellent in ejection stability as an ink jet clear ink and can record an image having high gloss brightness and both excellent uniformity of gloss brightness and gloss clarity. More specifically, the object is to provide a clear ink improving uniformity of gloss brightness and providing an image excellent in gloss clarity irrespective of the kind of a pigment ink used in combination or image density. Another object of the present invention is to provide an ink jet recording method, an ink set, an ink cartridge, a recording unit and an ink jet recording apparatus using the above-described clear ink.

The above objects can be achieved by the present invention described below. More specifically, a clear ink according to an embodiment of the present invention is an ink jet clear ink comprising a polymer fine particle, the polymer fine particle has a core-shell structure obtained by polymerizing an α,β-ethylenically unsaturated hydrophobic monomer (b) as a core polymer in the presence of a shell polymer that is a copolymer having at least a unit derived from an α,β-ethylenically unsaturated hydrophobic monomer (a) and a unit derived from a monomer selected from an α,β-ethylenically unsaturated acid monomer and a salt thereof, and the α,β-ethylenically unsaturated hydrophobic monomer (b) includes at least a monomer containing a chain structure saturated alkyl group.

According to the present invention, there can be provided a clear ink which is excellent in ejection stability as an ink jet clear ink and can record an image having high gloss brightness and both excellent uniformity of gloss brightness and gloss clarity. More specifically, a clear ink can be provided which improves uniformity of gloss brightness and provides an image excellent in gloss clarity irrespective of the kind of a pigment ink used in combination or image density. According to another embodiment of the present invention, there can be provided an ink jet recording method, an ink set, an ink cartridge, a recording unit and an ink jet recording apparatus using the above-described clear ink.

Further features of the present invention will become apparent from the following description of exemplary embodiments with reference to the attached drawings.

DESCRIPTION OF THE EMBODIMENTS

Figure 1:
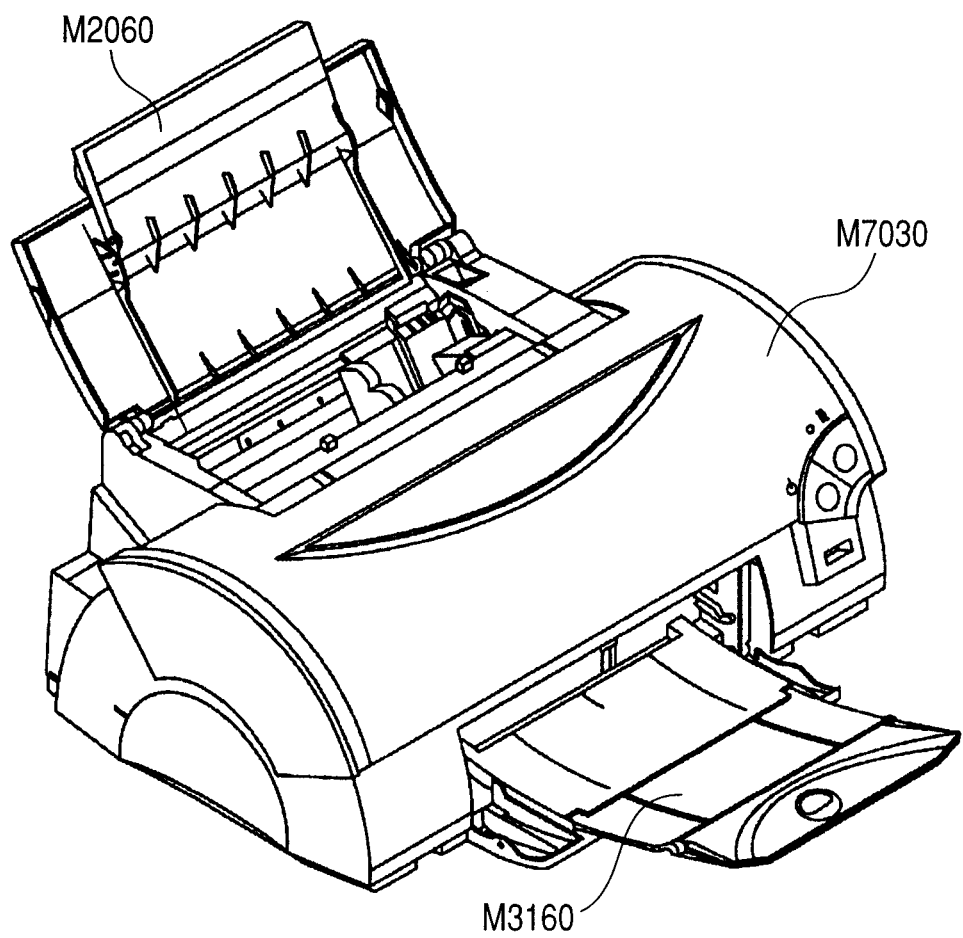
FIG. 1 is a perspective view of an ink jet recording apparatus.

Preferred embodiments of the present invention will now be described in detail in accordance with the accompanying drawings. Incidentally, polymer fine particle(s) having a core-shell structure used in a clear ink according to the present invention may be referred to as "polymer fine particle(s)" merely in the following description. With respect to "recording duty" in the present invention, a recording duty in the case where the amount of an ink applied to a recording medium is 15.64 g/m² is defined as 100%. For example, a case where eight ink droplets each having a mass of 3.5 ng (nanogram) are applied to a unit area (vertical resolution 600 dpi×horizontal resolution 600 dpi) is defined as 100% recording duty.

<Clear Ink>

The respective components making up the clear ink according to the present invention will hereinafter be described. The clear ink according to the present invention is favorably colorless, translucent-white or white. In particular, it is favorable that the absorption spectrum of the clear ink 50 times (by mass) diluted with pure water has no peak in a range of from 400 nm to 800 nm, and the abs value in the range of from 400 nm to 800 nm is 1.0 or less. In addition, the clear ink according to the present invention can favorably form a colorless and transparent film when the clear ink is applied to a recording medium. Such a clear ink does favorably not contain a coloring material such as a dye or pigment.

(Polymer Fine Particle Having Core-Shell Structure)

The polymer fine particle used in the clear ink according to the present invention is obtained by a specific synthetic process, which will be later described, and has a core-shell structure. The unit forming at least a core polymer in the polymer fine particle includes a unit derived from a monomer containing a chain structure saturated alkyl group as an α,β-ethylenically hydrophobic monomer (b). In the clear ink, the polymer fine particle is present being dispersed in an aqueous medium, i.e., in the state of the so-called emulsion.

The polymer fine particle has the core-shell structure, thereby clearly functionally separating the core portion from the shell portion. Such polymer fine particle having the core-shell structure has the advantage of being capable of imparting more functions to the clear ink compared with a polymer fine particle of a single layer structure.

A clear ink with an object of improving the uniformity of gloss brightness of an image irrespective of the kind of a pigment ink used in combination or image density like the clear ink according to the present invention requires containing a polymer fine particle of a particular structure, which will be later described. More specifically, it is necessary to use a unit derived from a monomer containing a chain structure saturated alkyl group as a unit forming a core polymer of the polymer fine particle having a core-shell structure. The present inventors suppose the reason for this is as follows.

Since a chain structure saturated aliphatic hydrocarbon has no polarity, van der Waals force acts as an interaction between molecules. Since the van der Waals force is very weak force, the polymer fine particle retains the softness when the clear ink is applied to a recording medium. Thereafter, an aqueous medium in the clear ink permeates the recording medium, thereby generating a permeation flow. At that time, the polymer fine particle in the clear ink has softness, so that the presence state of the polymer fine particle can be changed by the permeation flow. Specifically, the van der Waals force acts between the polymer fine particles on the surface of the recording medium in such a manner that the chain structure saturated alkyl group is closely packed by the permeation flow. Thus, the polymer fine particles are present on the surface of the recording medium so as to fill portions where no pigment is present, and become layered so as to level the surface of a region where the clear ink has been applied irrespective of the presence state of the pigment. It is thus supposed that an image which is excellent in gloss brightness, also has uniformity of gloss brightness and is excellent in gloss clarity is obtained.

Incidentally, the gloss clarity indicates the sharpness of an image reflected on a surface of the recorded image. When the gloss clarity is low, the image looks blurred. When the gloss clarity is high, the image looks sharp. The evaluation of the gloss clarity may be made by using, for example, a haze value. When the haze value is high, the gloss clarity tends to become low. When the haze value is low, the gloss clarity tends to become high.

<α,β-Ethylenically Unsaturated Hydrophobic Monomer and α,β-Ethylenically Unsaturated Acid Monomer>

The polymer fine particle used in the clear ink according to the present invention is obtained by polymerizing a monomer containing a chain structure saturated alkyl group as an α,β-ethylenically unsaturated hydrophobic monomer (b) in the presence of a shell polymer obtained by copolymerizing at least an α,β-ethylenically unsaturated hydrophobic monomer (a) and a monomer selected from an α,β-ethylenically unsaturated acid monomer and a salt thereof. In the present invention, both α,β-ethylenically unsaturated hydrophobic monomer (a) and α,β-ethylenically unsaturated hydrophobic monomer (b) favorably include the monomer containing a chain structure saturated alkyl group. In addition, as the α,β-ethylenically unsaturated hydrophobic monomer (a) and the α,β-ethylenically unsaturated hydrophobic monomer (b), at least the same kind of monomers containing a chain structure saturated alkyl group are particularly favorably included. Incidentally, as the α,β-ethylenically unsaturated hydrophobic monomer (a) and the α,β-ethylenically unsaturated hydrophobic monomer (b), may also be used oligomers or macromonomers. In the present invention, (meth)acryl hereinafter indicates acryl or methacryl.

The monomer containing a chain structure saturated alkyl group is a monomer having a chain structure saturated alkyl group bonded to an α,β-ethylenically unsaturated group through an ester linkage or amide linkage, and it is preferable in the present invention that the alkyl group has no substituent. Specific examples of the monomer containing a chain structure saturated alkyl group include monomers containing a straight-chain structure saturated alkyl group such as methyl(meth)acrylate, ethyl(meth)acrylate, propyl(meth)acrylate, butyl(meth)acrylate, hexyl(meth)acrylate, nonyl(meth)acrylate, dodecyl(meth)acrylate, tridecyl(meth)acrylate, tetradecyl(meth)acrylate and hexadecyl(meth)acrylate; and monomers containing a branched-chain structure saturated alkyl group such as isopropyl(meth)acrylate, isobutyl(meth)acrylate, t-butyl(meth)acrylate and 2-ethylhexyl(meth)acrylate.

Among these monomers, a (meth)acrylic ester of a chain structure saturated aliphatic primary alcohol is favorably used. The reason for this is that an acrylic ester or methacrylic ester has high reactivity, and thus is a particularly favorable monomer for synthesis of the polymer fine particles. In order to cause van der Waals force to act between polymer fine particles, the number of carbon atoms in the above-described ester is favorably controlled as described below.

When the (meth)acrylic ester of the chain structure saturated aliphatic primary alcohol is an acrylic ester, an acrylic ester of a chain structure saturated aliphatic primary alcohol having 4 to 12 carbon atoms is particularly favorably used. In addition, the ester portion of the acrylic ester is favorably of a branched-chain structure. Among others, 2-ethylhexyl acrylate is particularly favorably used. When the (meth)acrylic ester of the chain structure saturated aliphatic primary alcohol is a methacrylic ester, a methacrylic ester of a chain structure saturated aliphatic primary alcohol having 1 to 4 carbon atoms is particularly favorably used. If the number of carbon atoms is less than the above range, sufficient van der Waals force does not act between the resulting polymer fine particles, so that the polymer fine particles become rigid, and uniformity of gloss brightness and gloss clarity may not be sufficiently achieved in some cases though the gloss brightness of the resulting image can be improved. If the number of carbon atoms is more than the above range, the hydrophobicity of the resulting polymer fine particles becomes too high, so that the dispersion stability of the polymer fine particles in the clear ink is lowered, and ejection stability necessary for an ink jet clear ink may not be sufficiently achieved in some cases.

When a methacrylic ester and an acrylic ester are used in combination as units forming the polymer fine particle, the mass ratio of the unit derived from the methacrylic ester to the unit derived from the acrylic ester is favorably controlled as described below. Namely, the mass ratio between these units is favorably such that the proportions thereof are equivalent, or the proportion of the methacrylic ester is higher. In addition, the compositional (mass) ratio of [the unit derived from the methacrylic ester]/[the unit derived from the acrylic ester] is particularly favorably 0.5 or more and 1.0 or less from the viewpoint of the condition of a film formed. Incidentally, the compositional (mass) ratio means such a compositional (mass) ratio that the total of proportions of the respective units forming the polymer fine particle is regarded as 1.

Specific examples of other α,β-ethylenically unsaturated hydrophobic monomers other than the monomer containing a chain structure saturated alkyl group include aromatic unsaturated monomers such as styrene, α-methylstyrene, o-methylstyrene, m-methylstyrene, p-methylstyrene, p-tert-butylstyrene, phenyl(meth)acrylate and benzyl(meth)acrylate, itaconic esters such as benzyl itaconate, maleic esters such as dimethyl maleate, fumaric esters such as dimethyl fumarate, acrylonitrile, methacrylonitrile, and vinyl acetate. In the present invention, the feature that the α,β-ethylenically unsaturated monomer is hydrophobic means that the monomer does not contain a hydrophilic group such as a salt forming group (acidic group or basic group) or hydroxyl group. When these hydrophobic monomers are used, the proportion of the units derived from the hydrophobic monomers to the resulting polymer fine particle favorably exceeds 0.0% by mass and is less than 10.0% by mass. If the proportion is 10.0% by mass or more, uniformity of gloss brightness and gloss clarity may not be sufficiently achieved in some cases.

As the monomer selected from the α,β-ethylenically unsaturated acid monomer and the salt thereof, a hydrophilic monomer such as a monomer having an anionic group, or a salt thereof is favorably used. Specific examples of the monomer having the anionic group include monomers having a carboxyl group, such as (meth)acrylic acid, crotonic acid, ethacrylic acid, propylacrylic acid, isopropylacrylic acid, itaconic acid, maleic acid and fumaric acid, and derivatives thereof; monomers having a sulfonic group, such as stylenesulfonic acid, sulfonic acid-2-propylacrylamide, (meth)acrylic acid-2-ethyl sulfonate, acrylamide-t-butyl sulfone and vinylsulfonic acid, and derivatives thereof; and monomers having a phosphoric group, such as ethyl(meth)acrylate-2-ethyl phosphonate and vinylphosphonic acid, and derivatives thereof. Salts of these anionic group containing monomers may also be used likewise. Examples of the salts include the lithium salts, sodium salts, potassium salts, ammonium salts and organic ammonium salts of the above-described monomers.

Among these anionic group containing monomers and the salts thereof, a monomer having a carboxyl group, sulfonic group or phosphoric group, or a salt thereof is favorably used. As the monomer selected from the α,β-ethylenically unsaturated acid monomer and the salt thereof, a monomer selected from an unsaturated monomer containing a carboxylic acid group and a salt thereof is favorably used because the water resistance of the resulting polymer fine particle can be improved. Further, a monomer selected from (meth)acrylic acid and a salt thereof is particularly favorably used.

<Other Monomers>

In the polymer fine particle used in the clear ink according to the present invention, other commonly-used monomers other than such α,β-ethylenically unsaturated monomers as mentioned above may also be used so far as the effects of the present invention are not impaired. Examples of usable other monomers include (meth)acrylic acid hydroxyalkyl esters such as hydroxymethyl(meth)acrylate, hydroxyethyl(meth)acrylate and hydroxypropyl(meth)acrylate; monomers having an alkylene oxide group, such as methoxypolyethylene glycol(meth)acrylate, ethoxypolyethylene glycol(meth)acrylate, polyethylene glycol(meth)acrylate and polypropylene glycol(meth)acrylate; (meth)acrylamides such as (meth)

acrylamide, N-methylol(meth)acrylamide and N-isopropyl (meth)acrylamide; amino(meth)acrylates such as N,N-dimethylaminopropyl(meth)acrylate; vinyl compounds such as vinyl acetate, alkyl vinyl ethers, N-vinylacetamide, N-vinylformamide, N-vinylpyridine, N-vinylpyrrolidone, N-vinylcarbazole and divinylbenzene; and cross-linkable unsaturated monomers having 2 or more polymerizable double bonds, such as 1,6-hexanediol diacrylate and trimethylolpropane triacrylate. Needless to say, the present invention is not limited thereto.

<Acid Value of Polymer Fine Particle>

The polymer fine particle used in the clear ink according to the present invention favorably has an acid value of 40 mg KOH/g or more and 200 mg KOH/g or less, more favorably 60 mg KOH/g or more and 150 mg KOH/g or less. If the acid value of the polymer fine particle is less than 40 mg KOH/g, the hydrophobicity of the polymer fine particle becomes high, so that the dispersion stability of the polymer fine particle is not sufficiently achieved, and ejection stability necessary for an ink jet clear ink may not be sufficiently achieved in some cases. In addition, since the hydrophobicity of the polymer fine particle becomes high, the polymer fine particles are hard to be broadly present when the clear ink is applied to a recording medium, so that gloss brightness and gloss clarity may not be sufficiently achieved in some cases. If the acid value of the polymer fine particle exceeds 200 mg KOH/g on the other hand, the uniformity of gloss brightness may not be sufficiently improved in some cases. The reason for this is that the dispersion state of the polymer fine particle in an aqueous medium is stabilized due to the high acid value. Therefore, when a clear ink containing such a polymer fine particle is applied to a recording medium, the proportion of the polymer fine particles that permeate the interior of the recording medium comes to increase, and the proportion of the polymer fine particles that remain on the surface of the recording medium decreases to the contrary.

By such reason, the uniformity of gloss brightness may not be sufficiently improved in some cases.

<Acid Value of Shell Polymer>

In the polymer fine particle used in the clear ink according to the present invention, the acid value of the shell polymer is favorably 60 mg KOH/g or more and 400 mg KOH/g or less, more favorably 100 mg KOH/g or more and 300 mg KOH/g or less. If the acid value of the shell polymer is less than 60 mg KOH/g, the dispersion stability of the polymer fine particle in an aqueous medium is not sufficiently achieved, and ejection stability necessary for an ink jet clear ink may not be sufficiently achieved in some cases. In addition, since the hydrophobicity of the polymer fine particle becomes high, the polymer fine particles are hard to be broadly present when the clear ink is applied to a recording medium, so that gloss brightness and gloss clarity may not be sufficiently achieved in some cases. If the acid value of the shell polymer exceeds 400 mg KOH/g on the other hand, the hydrophilicity of the polymer fine particle becomes high, so that the polymer fine particles are hard to remain on the surface of the recording medium, and the gloss brightness may not be sufficiently improved in some cases.

<Ratio of Core/Shell>

In the polymer fine particle used in the clear ink according to the present invention, the core/shell ratio by mass of the core polymer to the shell polymer is favorably 0.33 or more and 1.5 or less. If this ratio is beyond this range, both functions of the core and the shell may not be obtained in some cases. Specifically, if the core/shell ratio is less than 0.33, the gloss brightness may not be sufficiently improved in some cases. If the core/shell ratio exceeds 1.5 on the other hand, ejection stability necessary for an ink jet clear ink may not be sufficiently achieved in some cases.

Incidentally, with respect to the polymer fine particle having the core-shell structure the constitution of which is unknown, the core/shell ratio can be determined by separating the core polymer and the shell polymer from each other in the following manner and calculating the respective masses. First, water-soluble components are removed from a clear ink containing the polymer fine particle having the core-shell structure using a permeable membrane to take out the polymer fine particles. After the resultant polymer fine particles are dispersed in water, an acid is dropped into this aqueous dispersion to destabilize the dispersion state of the polymer fine particles. This liquid is centrifuged for 15 hours at 80,000 rpm to separate the polymer component. The separated polymer component is washed several times with water and then dried under reduced pressure to obtain a solid polymer.

A sample obtained by dissolving the polymer thus obtained in an organic solvent such as tetrahydrofuran is subjected to separation by means of gel permeation chromatography (GPC) equipped with a differential refractometer. At this time, the kind of an organic solvent used as an eluate, and the kinds and number of columns used in separation are suitably changed, whereby the shell polymer and core polymer, which are different in molecular weight and monomer composition from each other, can be separated. More specifically, after the eluate that passed through a detector is sampled, respective components are dried to solids, thereby obtaining a plurality of solid polymers. The compositional ratio of the monomers forming each polymer is then determined by pyrolysis GC/MS and NMR.

In the production process of the polymer fine particle specified in the present invention, a polymer with a more hydrophilic composition containing an acidic functional group and/or a hydroxyl group in a relatively large amount becomes a shell polymer. In the polymer fine particle having the core-shell structure obtained by the production process specified in the present invention, the molecular weight of the shell polymer tends to become smaller than the molecular weight of the core polymer. Thus, the core polymer may also be simply distinguished from the shell polymer by difference in molecular weight.

<Weight-Average Molecular Weight of Shell Polymer>

In the polymer fine particle used in the clear ink according to the present invention, the weight-average molecular weight of the shell polymer is favorably 3,000 or more and 50,000 or less, more favorably 3,000 or more and 20,000 or less. If the weight-average molecular weight of the shell polymer is less than 3,000, a steric repulsive layer is hard to be formed due to the small weight-average molecular weight, so that it may be difficult in some cases to synthesize the polymer fine particle having the structure specified in the present invention. In addition, since the polymer fine particle synthesized becomes unstable, in some cases, storage stability may not be sufficiently achieved, and ejection stability may not be sufficiently achieved attending thereon. If the weight-average molecular weight of the shell polymer exceeds 50,000 on the other hand, ejection stability necessary for an ink jet clear ink may not be sufficiently achieved in some cases. The reason for this is that when the weight-average molecular weight of the shell polymer that is a shell of each polymer fine particle becomes large, the viscosity of the clear ink containing the polymer fine particle tends to become greatly high.

Incidentally, the weight-average molecular weight of the shell polymer can be measured with the solid shell polymer obtained by the above-described method of calculating the core/shell ratio. A sample obtained by dissolving the resulting shell polymer in an organic solvent such as tetrahydrofuran is subjected to measurement by means of GPC, whereby the weight-average molecular weight can be determined in terms of polystyrene.

<Minimum Film Formation Temperature of Polymer Fine Particle>

The polymer fine particle used in the clear ink according to the present invention favorably has a minimum film formation temperature (° C.) of 25° C. or less. If the minimum film formation temperature exceeds 25° C., a film cannot be formed in a general environment of room temperature when a clear ink containing such a polymer fine particle is applied to a recording medium, and so gloss brightness, gloss clarity and uniformity of gloss brightness may not be sufficiently achieved in some cases. The minimum film formation temperature (° C.) of the polymer fine particle is favorably −50° C. or more. Incidentally, the minimum film formation temperature of the polymer fine particle can be controlled by changing the kinds and compositional ratio of monomers used and the weight-average molecular weight of the polymer fine particle. The minimum film formation temperature of the polymer fine particle can be measured according to the testing method of ISO 2115.

<Constituent Unit of Shell Polymer>

A unit derived from a monomer selected from an unsaturated monomer containing a carboxylic acid group and a salt thereof as mentioned above, which can be used as a unit forming the polymer fine particle used in the clear ink according to the present invention, is favorably present only in the shell polymer of the core-shell structure. When the polymer fine particle formed in this manner is used, clear functional separation is made between the core portion and the shell portion, and the resulting ink is caused to have functions such as gloss brightness, film-forming ability, dispersion stability and ejection stability. Incidentally, when the unit derived from the a monomer selected from an unsaturated monomer containing a carboxylic acid group and a salt thereof is present in both core polymer and shell polymer, uniformity of gloss brightness and gloss clarity may not be sufficiently achieved in some cases.

<Volume-Average Particle Size of Polymer Fine Particle>

The polymer fine particle used in the clear ink according to the present invention favorably has a volume-average particle size of 30 nm or more and 200 nm or less, more favorably 40 nm or more and 170 nm or less. If the volume-average particle size is less than 30 nm, the proportion of such polymer fine particles that permeate the interior of a recording medium comes to increase when a clear ink containing the polymer fine particles is applied to the recording medium, and the proportion of the polymer fine particles that remain on the surface of the recording medium decreases to the contrary. By such reason, the gloss brightness may not be sufficiently improved in some cases. If the volume-average particle size exceeds 200 nm on the other hand, ejection orifices of a recording head or an ink flow path is easily clogged with or attached to such polymer fine particle, so that ejection stability necessary for an ink jet clear ink may not be sufficiently achieved in some cases.

Incidentally, the volume-average particle size of the polymer fine particle in the present invention is measured under the following conditions. Namely, the volume-average particle size means a volume-average particle size obtained by 50 times (by volume) diluting the clear ink with pure water and conducting measurement under measuring conditions of Set Zero: 30 s, number of measurements: 3 times, measuring time: 180 seconds, and refractive index: 1.5 using UPA-EX (manufactured by NIKKISO). Needless to say, the apparatus and conditions for measuring the volume-average particle size of the polymer fine particle used in the present invention are not limited to the above.

<Content of Polymer Fine Particle in Clear Ink>

The content (% by mass) of the polymer fine particle in the clear ink is favorably 0.3% by mass or more and 5.0% by mass or less based on the total mass of the clear ink. If the content is less than 0.3% by mass, a sufficient amount of the polymer fine particles cannot remain on the surface of a recording medium, and so gloss brightness may not be sufficiently improved in some cases. If the content exceeds 5.0% by mass on the other hand, the content of solids becomes too high, so that the height of dots formed on the surface of a recording medium when such a clear ink is applied to the recording medium becomes high, and so gloss clarity may not be sufficiently achieved in some cases. In addition, ejection stability necessary for a clear ink may not be sufficiently achieved in some cases.

<Synthetic Process of Polymer Fine Particle Having Core-Shell Structure>

The polymer fine particle having the core-shell structure contained in the clear ink according to the present invention is obtained by polymerizing a core polymer in the presence of a shell polymer. The reason why the polymer fine particle having the core-shell structure obtained by such a synthetic process is used in the present invention is as follows. In such synthetic process, polymerization progresses while a core polymer with a relatively low water solubility is being selectively incorporated in the interior of a shell polymer with a relatively high water solubility. Therefore, a unit derived from prepared monomers of a core component is arranged inside, and a unit derived from prepared monomers of a shell component is arranged outside, whereby such a polymer having a core-shell structure that a core polymer is covered with a shell polymer can be synthesized. In the polymer fine particle synthesized by such a process, a chemical bond is hard to be caused at a boundary between a core portion and a shell portion. In other words, the core portion and the shell portion form respective layers, and the above-described functional separation is clearly made. In addition, when such a process is used, a polymer fine particle having a desired core/shell ratio can be easily synthesized. In this case, great difference in water solubility between the shell polymer and the core polymer is particularly favorable because a polymer fine particle having a core/shell ratio more exactly controlled can be synthesized.

Specifically, the polymer fine particle having the core-shell structure contained in the clear ink according to the present invention is favorably synthesized in the following manner. After solution polymerization of monomers is first conducted in an organic solvent, and the resultant product is dried under reduced pressure to remove the solvent, the product is neutralized with an alkaline agent, thereby obtaining an aqueous solution or aqueous dispersion of a shell polymer. Monomers which become a core polymer are then polymerized in the presence of the shell polymer thus obtained, thereby obtaining polymer fine particles having a core-shell structure. At this time, the polymer fine particles having the core-shell structure can be sufficiently and efficiently synthesized without using a general emulsifier. Incidentally, the synthetic process of the shell polymer is not limited to the above-described process, and the synthesis may be conducted by any process so far as the resulting polymer fine particles satisfy the requirements of the present invention.

In general, as the synthetic process of the polymer fine particles having the core-shell structure, the following process is mentioned in addition to the above-described process.

After core component monomers are first copolymerized in the presence of an emulsifier to synthesize core particles, which will become cores, shell component monomers are further copolymerized to synthesize polymer fine particles having a core-shell structure. However, according to this synthetic process, the polymer is easy to interact at a boundary between a core portion and a shell portion, therefore the core portion and the shell portion of the polymer particle may not be clearly functionally separated. In addition, when an emulsifier having polymerizability is used, the polymer is easy to interact at a boundary between a core portion and a shell portion. Therefore, polymer fine particles having the intended core-shell structure may often not be obtained unless a device of, for example, intentionally cross-linking the core polymer or intentionally cross-linking the shell polymer is made.

(Other Polymers)

Polymers other than the polymer fine particle having the core-shell structure may be added to the clear ink according to the present invention. Such a polymer may also be used as a dispersant for stably dispersing the polymer fine particle in an aqueous medium, or added to the clear ink for other objects of, for example, improving the scratch resistance of an image to be formed.

The polymer usable in addition to the polymer fine particle having the core-shell structure may be any polymer. Examples thereof include acrylic acid-containing polymers comprised of the monomer units used in the polymer fine particle as described above. The forms of the polymer include a block copolymer, a random copolymer, a graft copolymer and a salt thereof. Natural polymers such as rosin, shellac and starch may also be used. These polymers are favorably alkali-soluble polymers soluble in an aqueous solution with a base dissolved therein. In the present invention, specifically, polymers synthesized by using at least an α,β-ethylenically unsaturated hydrophobic monomer and a monomer selected from an α,β-ethylenically unsaturated acid monomer and a salt thereof as mentioned above are favorably used. Among them, copolymers containing at least an α,β-ethylenically unsaturated hydrophobic monomer such as styrene or a derivative thereof (such as α-methyl styrene) and an α,β-ethylenically unsaturated acid monomer such as (meth)acrylic acid or a salt thereof are particularly favorably used.

The content B (% by mass) of the other polymer than the polymer fine particle having the core-shell structure in the clear ink is favorably 5.0% by mass or less based on the total mass of the clear ink. The total content (A+B) of the content A (% by mass) of the polymer fine particle having the core-shell structure and the content B (% by mass) of the other polymer is favorably 0.3% by mass or more and 7.0% by mass or less. The mass ratio A/B of the content A (% by mass) of the polymer fine particle having the core-shell structure to the content B (% by mass) of the other polymer is favorably 0.25 or more and 4.0 or less, more favorably 0.33 or more and 3.0 or less. If the mass ratio A/B is beyond the above range, the uniformity of gloss brightness and gloss clarity of an image to be formed may not be sufficiently achieved in some cases. When the polymer other than the polymer fine particle having the core-shell structure is used, the weight-average molecular weight of the polymer is favorably 1,000 or more and 15,000 or less, more favorably 5,000 or more and 13,000 or less. The acid value of the polymer is favorably 40 mg KOH/g or more and 200 mg KOH/g or less, more favorably 90 mg KOH/g or more and 200 mg KOH/g or less.

(Aqueous Medium)

An aqueous medium that is water or a mixed solvent of water and a water-soluble organic solvent may be used in the clear ink. The content (% by mass) of the water-soluble organic solvent in the clear ink is favorably 3.0% by mass or more and 50.0% by mass or less based on the total mass of the clear ink. No particular limitation is imposed on the water-soluble organic solvent so far as it is soluble in water, and any water-soluble organic solvent known as a solvent for ink jet inks in this technical field may be used.

Specific examples of usable water-soluble organic solvents include alkyl alcohols having 1 to 4 carbon atoms, such as methanol, ethanol, isopropanol and butanol; linear or branched alkanediols such as 1,3-butanediol, 1,5-pentanediol, 1,6-hexanediol and 3-methyl-1,5-pentanediol; mono (di or tri) $C_1$-$C_4$ alkyl ethers of polyhydric alcohols, such as ethylene glycol methyl (ethyl or butyl) ether, diethylene glycol methyl (ethyl or butyl) ether and triethylene glycol methyl (ethyl or butyl) ether; alkylene glycols the alkylene group of which has 2 to 6 carbon atoms, such as ethylene glycol, diethylene glycol, triethylene glycol, tetraethylene glycol, propylene glycol, butylene glycol, hexylene glycol and thiodiglycol; polyhydric alcohols such as glycerol and 1,2,6-hexanetriol; polyalkylene glycols having an average molecular weight of from about 200 to about 1,000, such as polyethylene glycol and polypropylene glycol; and heterocyclic compounds such as 2-pyrrolidone, N-methyl-2-pyrrolidone and 1,3-dimethyl-2-imidazolidinone.

As the water, is favorably used deionized water (ion-exchanged water). The content (% by mass) of water in the clear ink is favorably 50.0% by mass or more and 95.0% by mass or less based on the total mass of the clear ink.

(Other Components)

The clear ink may contain a water-soluble organic compound, which is solid at ordinary temperature, such as urea, urea derivative, trimethylolpropane or trimethylol-ethane in addition to the above-described components. The content (% by mass) of such a water-soluble organic compound in the clear ink is favorably 0.1% by mass or more and 20.0% by mass or less, more favorably 1.0% by mass or more and 15.0% by mass or less, based on the total mass of the clear ink. In addition, the clear ink may contain various additives such as a surfactant, a pH adjustor, a rust preventive, a preservative, a mildewproofing agent, an antioxidant and an antireductant, as needed, in order to provide the clear ink with desired physical properties.

<Pigment Ink>

The clear ink according to the present invention may be used as an ink set of the clear ink combined with a pigment ink. Respective components making up the pigment ink usable together with the clear ink according to the present invention will hereinafter be described.

Examples of a coloring material used in the pigment ink include inorganic pigments such as carbon black publicly known in this technical field, and organic pigments. As a dispersing system of the pigment, may be used any known dispersion system such as a self-dispersion pigment with a hydrophilic group or a polymer bonded to the surface of pigment particle, a polymer-dispersed pigment, and a microcapsule pigment. The content (% by mass) of the pigment in the pigment ink is favorably 0.1% by mass or more and 10.0% by mass or less, more favorably 1.0% by mass or more and 10.0% by mass or less, based on the total mass of the pigment ink. When plural inks that have the same hue as each other and are different in the content of a coloring material from each other are used as the pigment ink, it is only necessary to suitably determine the contents of the pigments in the respective inks so as to gradually differ within the above content range.

(Polymer Component)

To the pigment ink, may be added another polymer than the polymer used as a dispersant in case of the polymer-dispersed pigment, and a polymer may be further added even in case of the self-dispersion pigment or the microcapsule pigment. Such a polymer may also be used for more stably dispersing the pigment in an aqueous medium, or added to the ink for other objects of, for example, improving the scratch resistance of an image to be formed or the fixability of the pigment to a recording medium.

The polymer capable of being added to the pigment ink may be any polymer. Examples thereof include such a polymer fine particle used in the clear ink according to the present invention as described above and acrylic acid-containing polymers comprised of the monomer units used in the polymer fine particle. The forms of the polymer capable of being added to the pigment ink include a block copolymer, a random copolymer, a graft copolymer and a salt thereof. These polymers are favorably alkali-soluble polymers soluble in an aqueous solution with a base dissolved therein. In the present invention, specifically, polymers synthesized by using at least an $\alpha,\beta$-ethylenically unsaturated hydrophobic monomer and a monomer selected from an $\alpha,\beta$-ethylenically unsaturated acid monomer and a salt thereof as mentioned above and favorably used. Among others, copolymers containing at least styrene and acrylic acid are particularly favorably used.

The content (% by mass) of the polymer in the pigment ink is favorably 0.5% by mass or more and 5.0% by mass or less based on the total mass of the pigment ink. The weight-average molecular weight of the polymer is favorably 1,000 or more and 15,000 or less, and the acid value of the polymer is favorably 80 mg KOH/g or more and 250 mg KOH/g or less, more favorably 90 mg KOH/g or more and 200 mg KOH/g or less.

The polymer added to the pigment ink may be the same as or different from the polymer added to the clear ink. However, in the present invention, the same polymer fine particle having the core-shell structure as those contained in the clear ink is particularly favorably allowed to be contained even in the pigment ink from the viewpoint of compatibility of the pigment ink with the clear ink on a recording medium. When plural inks that have the same hue as each other and are different in the content of a coloring material from each other are used as the pigment ink, the polymer fine particle having the core-shell structure may be allowed to be contained in all the pigment inks or only a part thereof. Even when plural inks that are different in hue are used, the polymer fine particle having the core-shell structure may be allowed to be contained in all the pigment inks or only a part thereof. In order to achieve, for example, the uniformity of gloss brightness at a higher level, the polymer fine particle may be allowed to be contained in only a part of the inks, or the polymer fine particle may be allowed to be contained in all the inks for improving resistance to bronzing. When the polymer fine particle having the core-shell structure are allowed to be contained in the plural inks, the polymer fine particle used in the respective inks may be the same as or different from each other.

(Aqueous Medium and Other Components)

An aqueous medium that is water or a mixed solvent of water and a water-soluble organic solvent may be used in the pigment ink. The content (% by mass) of the water-soluble organic solvent in the pigment ink is favorably 3.0% by mass or more and 50.0% by mass or less based on the total mass of the pigment ink. As the water-soluble organic solvent, may be used the same water-soluble organic solvent as that mentioned as the solvent usable in the clear ink. As the water, is favorably used deionized water (ion-exchanged water). The content (% by mass) of water in the pigment ink is favorably 50.0% by mass or more and 95.0% by mass or less based on the total mass of the pigment ink. The same other components as those mentioned as the components usable in the clear ink may be used in the pigment ink.

<Recording Medium>

The clear ink according to the present invention may be applied to any recording medium. However, recording medium on the surface of which the pigment in the pigment ink and the polymer fine particle in the clear ink can be allowed to be present is favorably used. Examples of such a recording medium include swelling type and absorption type recording media. In the present invention, a recording medium the ink receiving layer of which is glossy is favorably used, and a recording medium the ink receiving layer of which contains a glossy layer is more favorably used. Specifically, a recording medium the 20° gloss value of the surface of which is 10 or more is favorably used. Incidentally, the 20° gloss value can be measured by means of, for example, a micro-haze meter (manufactured by BYK-Gardner).

As examples of the recording medium having such properties, may be mentioned Canon Photo Paper-Gloss Gold GL-101 and Canon Photo Paper-Gloss Professional PR-201 (products of Canon Inc.); Photo Crispia High Gloss and Photo Paper Gloss (products of EPSON); and Kassai Photo-finish Pro and Kassai Photo-finish Hi (products of FUJIFILM CORPORATION). Needless to say, recording media to which the clear ink according to the present invention can be applied are not limited thereto.

<Ink Jet Recording Method>

The clear ink according to the present invention is used in an ink jet recording method in which the clear ink is ejected by an ink jet system to apply the clear ink to a recording medium. In particular, for the present invention, an ink jet recording method utilizing thermal energy may be favorably used. Description will hereinafter be given centering on this system.

An ink jet recording method according to another embodiment of the present invention is an ink jet recording method using a clear ink and a pigment ink and includes the following steps. More specifically, the method including a step (I) of conducting recording on a recording medium with the pigment ink and a step (II) of ejecting the clear ink by an ink jet system to apply the clear ink to the recording medium. The clear ink of the present invention as described above is used as the clear ink. With respect to these steps (I) and (II), are supposed a case of conducting the step (II) after the step (I), a case of conducting the step (I) after the step (II) and a case of combining these cases. The steps may be conducted in any order. However, in the present invention, since application of the clear ink is applied on to an image formed with the pigment ink can protect the image by a polymer layer, it is particularly favorable that the step (I) is conducted in a region of at least a part of the recording medium, and the step (II) is then conducted.

The region to which the clear ink is applied is favorably at least a region where no image has been recorded on one page of a recording medium with the pigment ink (non-recorded region with the pigment ink). Further, it is particularly favorable that a region where the clear ink is applied to the recording medium in the step (II) and a region where the pigment ink is applied to the recording medium in the step (I) overlap in at least a part.

An object of the present invention is to improve the uniformity of gloss brightness of an image recorded with the pigment ink irrespective of image density of the image. Accordingly, with respect to a portion recorded with the pigment ink, the application amount of the clear ink is favorably controlled according to the kind and image density of the pigment ink. In particular, a larger amount of the clear ink is applied to a region recorded with an ink relatively low in the content of a pigment to adjust the gloss brightness of this region, whereby the gloss brightness of this region can be made equivalent to that of a region recorded with an ink relatively high in the content of the pigment. As a result, the uniformity of gloss brightness of the whole image can be more effectively improved.

Incidentally, it is at least necessary to apply the clear ink according to the present invention to a recording medium by the ink jet system. However, no particular limitation is imposed on a method for applying the pigment ink to the recording medium. However, in the ink jet recording method according to the present invention, not only the clear ink but also the pigment ink is particularly favorably ejected by the ink jet system to conduct recording on recording medium. According to such an ink jet recording method, the clear ink can be exactly applied to an intended region such as a region including at least an image recorded with the pigment ink, and the application amount of the clear ink can be suitably controlled. The application amounts of the pigment ink and clear ink by the ink jet system can be controlling by suitably determining the recording duty.

<Ink Set>

The clear ink according to the present invention may be used as an ink jet ink set in which at least one pigment ink is combined therewith. With respect to the hue of the pigment ink, one or more hues may be selected from those of cyan, magenta, yellow, black, red, green and blue inks. As the pigment ink making up the ink set, plural inks that have the same hue as each other and are different in the content of a coloring material from each other may also be used. Combinations of such plural inks include inks having a hue of black, such as black, light black, gray and light gray. In addition, inks having a hue of cyan, such as deep cyan, medium cyan and light cyan, and inks having a hue of magenta, such as deep magenta, medium magenta and light magenta may also be mentioned. Needless to say, in the present invention, the inks are not limited to the inks of these hues, and the types of the inks, such as "deep", "medium" and "light", are also not limited thereto. In the present invention, the same polymer fine particle having the core-shell structure as those contained in the clear ink is particularly favorably allowed to be contained in at least one ink of the pigment inks making up the ink set. Needless to say, a pigment ink containing no polymer fine particle having the core-shell structure may also be included in the plural pigment inks making up the ink set.

<Ink Cartridge>

Ink cartridge suitable for use in recording using the clear ink according to the present invention includes an ink cartridge according to the present invention, which is equipped with a storage portion storing such a clear ink. The structure of the ink cartridge is such that the ink storage portion is constituted of a negative pressure generating member storage chamber for storing a negative pressure generating member which holds an ink in a state of being impregnated by a negative pressure, and an ink storage chamber for storing the clear ink in a state of not being impregnated by the negative pressure generating member. The ink storage portion may be so constructed that the whole amount of the clear ink is held in a state of being impregnated by the negative pressure generating member without having such an ink storage chamber as described above, or that the whole amount of the clear ink is stored in a state of not being impregnated by the negative pressure generating member without having the negative pressure generating member. In addition, the ink cartridge may be constructed so as to have an ink storage portion and a recording head.

<Recording Unit>

Recording unit suitable for use in recording using the clear ink according to the present invention includes a recording unit according to the present invention, which is equipped with a storage portion for storing such a clear ink, and a recording head for ejecting the clear ink. In particular, a recording unit in which the recording head ejects the clear ink by applying thermal energy corresponding to a recording signal to the clear ink may be favorably used.

<Ink Jet Recording Apparatus>

Ink jet recording apparatus suitable for use in recording using the clear ink according to the present invention include an ink jet recording apparatus according to the present invention, which is equipped with a storage portion for storing such a clear ink, and a recording head for ejecting the clear ink. In particular, an ink jet recording apparatus in which the clear ink is ejected by applying thermal energy corresponding to a recording signal to the clear ink in the interior of the recording head having the storage portion for storing the clear ink is mentioned. Incidentally, in the present invention, an ink described in the following description may be applied both for the clear ink according to the present invention and for the pigment ink used together with the clear ink.

The schematic construction of a mechanism portion of the ink jet recording apparatus will hereinafter be described. The ink jet recording apparatus is constructed by a paper feeding portion, a conveying portion, a carriage portion, a paper discharging portion, a cleaning portion and a housing portion for protecting these portions and imparting design characteristics, in terms of role of the respective mechanisms.

Figure 2:
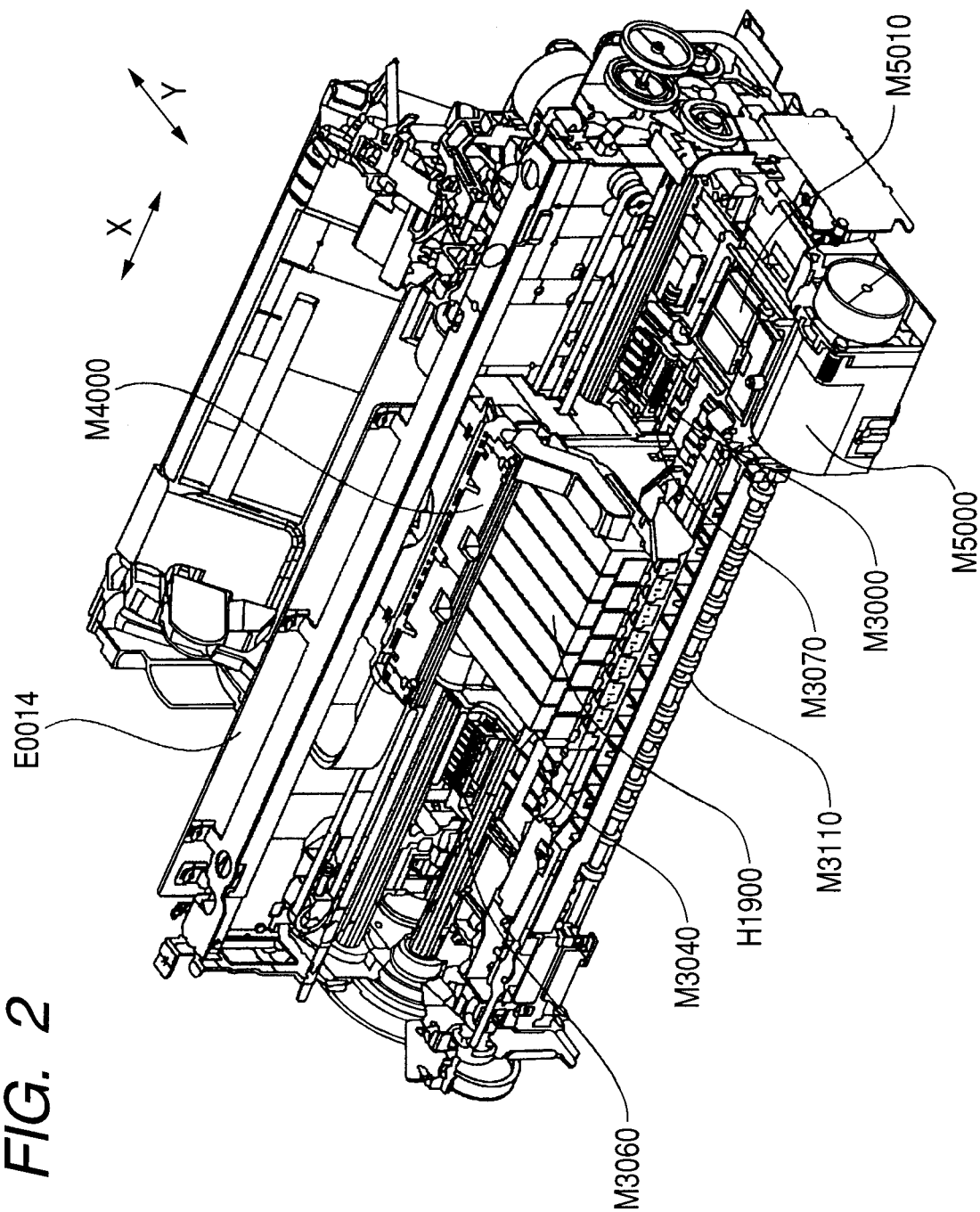
FIG. 2 is a perspective view of a mechanism part of the ink jet recording apparatus.
Figure 3:
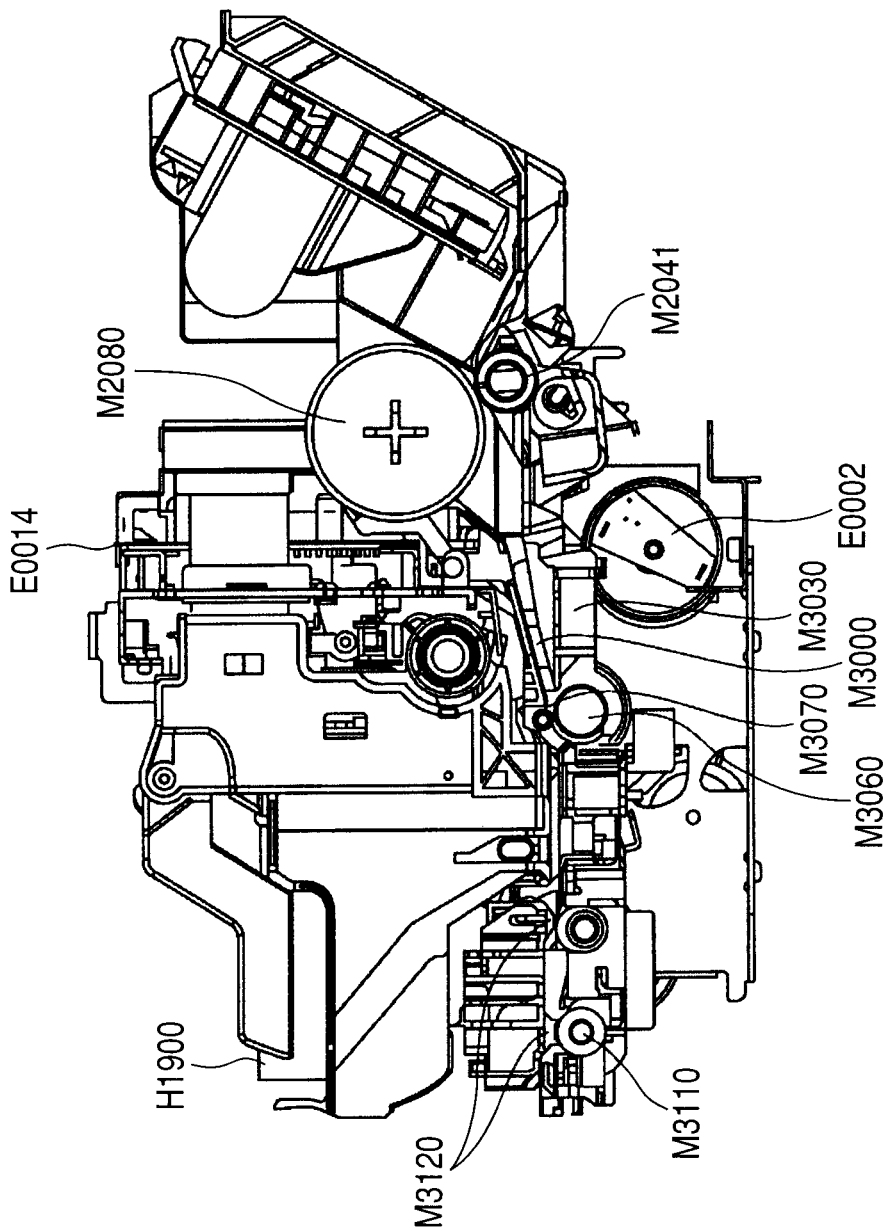
FIG. 3 is a sectional view of the ink jet recording apparatus.

FIG. 1 is a perspective view of the ink jet recording apparatus. FIGS. 2 and 3 are drawings illustrating the internal mechanism of the ink jet recording apparatus, in which FIG. 2 is a perspective view as viewed from the top right-hand, and FIG. 3 illustrates a sectional side elevation of the ink jet recording apparatus.

Upon feeding of paper, only a predetermined number of recording media is sent to a nip portion constructed by a paper feed roller M2080 and a separating roller M2041 in the paper feeding portion including a paper feeding tray M2060. A sheet of the recording media is separated in the nip part, and only a recording medium sheet located uppermost is conveyed. The recording medium sent to the conveying portion is guided to a pinch roller holder M3000 and a paper guide flapper M3030 and conveyed to a pair of rollers of a conveying roller M3060 and a pinch roller M3070. The pair of rollers having the conveying roller M3060 and the pinch roller M3070 is rotated by driving of an LF motor E0002, and the recording medium sheet is conveyed on a platen M3040 by this rotation.

Upon formation of an image on the recording medium, the carriage portion arranges a recording head H1001 at an intended image recording position, and an ink is ejected on the recording medium according to a signal from an electric substrate E0014. While conducting recording by the recording head H1001, main scanning in which a carriage M4000 scans in a column direction and secondary scanning in which the conveying roller M3060 conveys the recording medium in a row direction are alternately repeated, thereby recording an image on the recording medium. The recording medium, on which the image has been recorded, is conveyed in a state of being nipped between a first paper discharging roller M3110 and a spur M3120 in the paper discharging portion and discharged on a paper discharging tray M3160.

<Construction of Recording Head>

Figure 4:
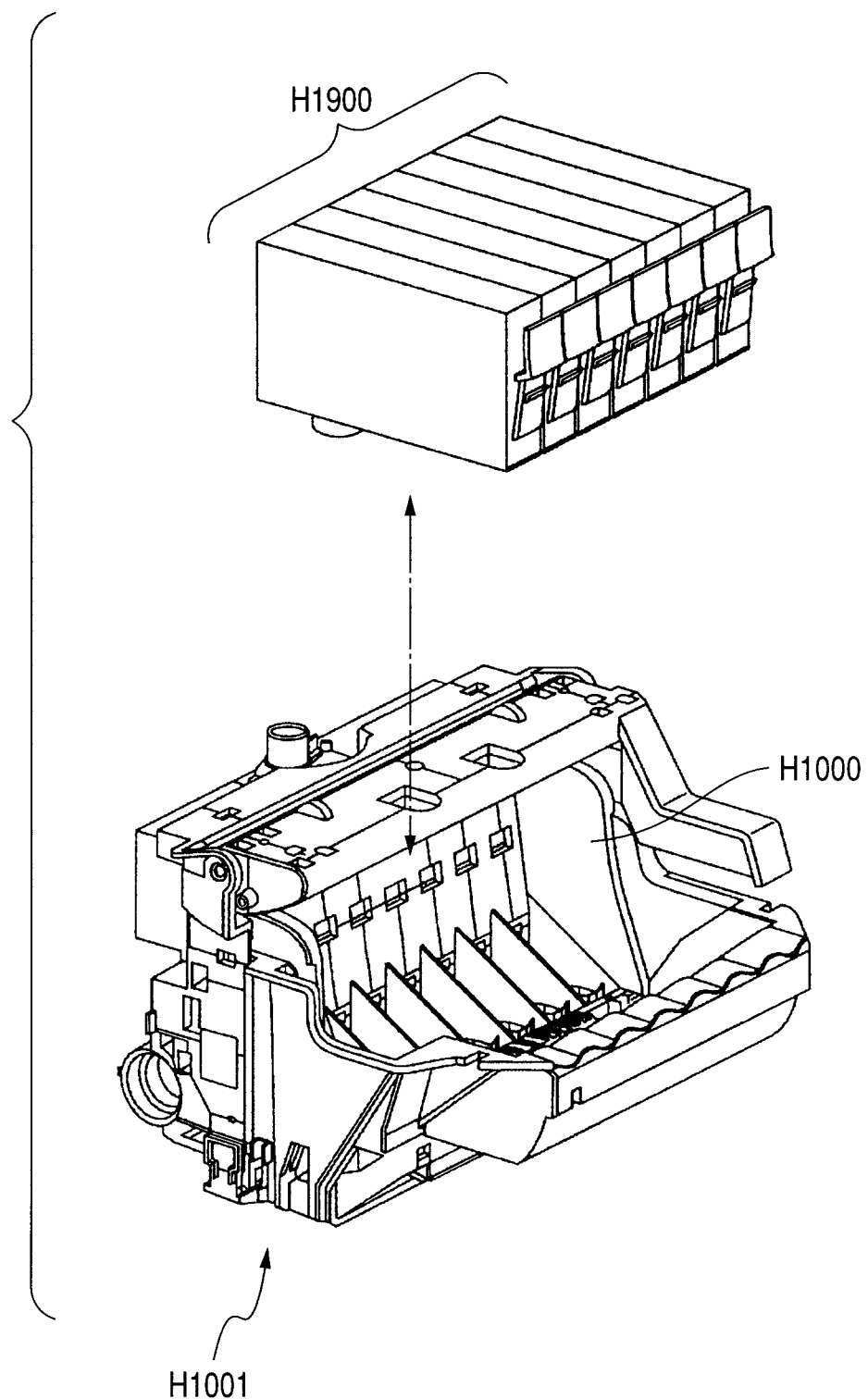
FIG. 4 is a perspective view illustrating a state that an ink cartridge is installed in a head cartridge.

The construction of a head cartridge H1000 will be described. FIG. 4 illustrates the construction of the head cartridge H1000 and a manner of installing an ink cartridge H1900 in the head cartridge H1000. The head cartridge H1000 has a recording head H1001, a unit for installing the ink cartridge H1900 and a unit for feeding an ink from the ink cartridge H1900 to the recording head and is detachably installed on the carriage M4000.

The ink jet recording apparatus records an image with respective inks of yellow, magenta, cyan, black, light magenta, light cyan and clear. Accordingly, ink cartridges H1900 for the 7 colors are independently provided.

Figure 5:
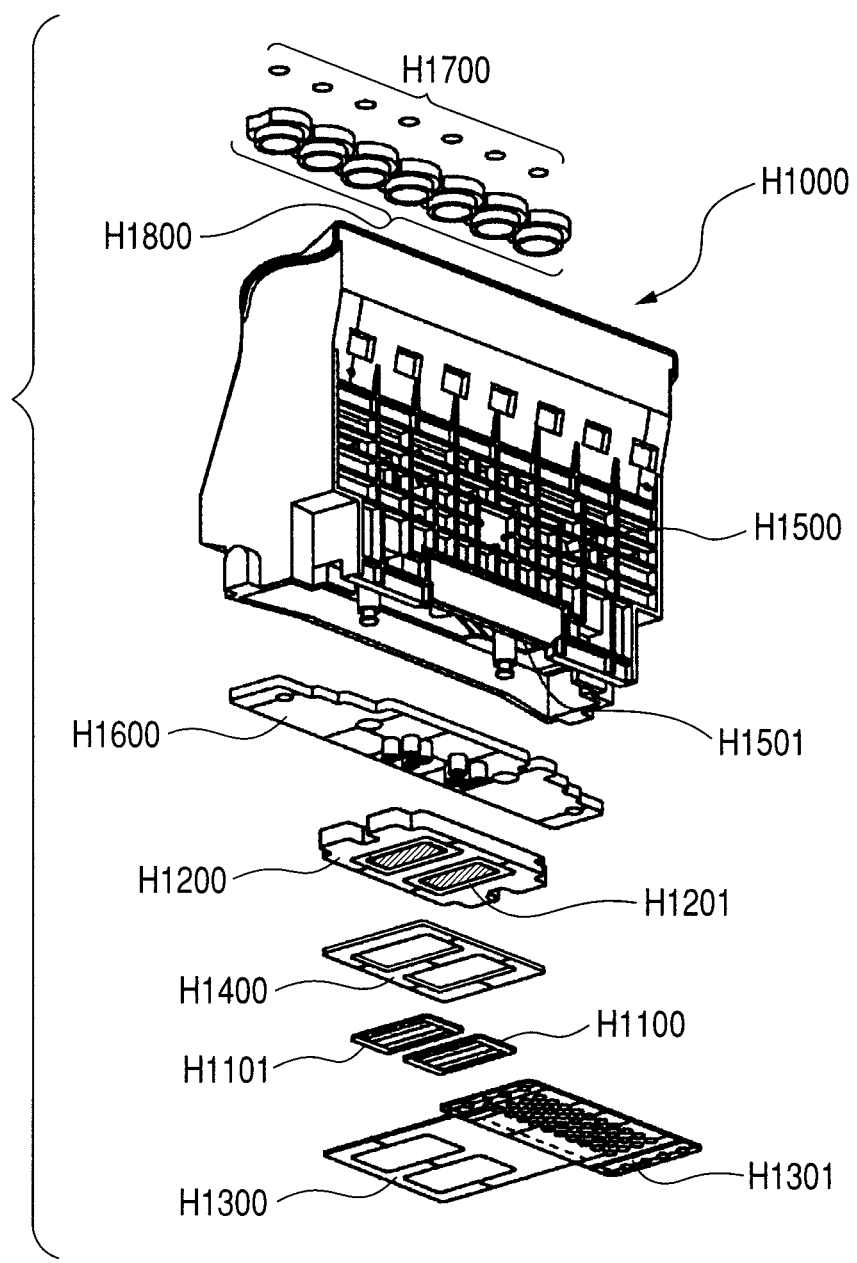
FIG. 5 is an exploded perspective view of the head cartridge.

FIG. 5 is an exploded perspective view of the head cartridge H1000. The head cartridge H1000 is constructed by a recording element substrate, a plate, an electric wiring substrate H1300, a cartridge holder H1500, a flow path forming member H1600, filters H1700 and seal rubber H1800. The recording element substrate is constructed by a first recording element substrate H1100 and a second recording element substrate H1101, and the plate is constructed by a first plate H1200 and a second plate H1400.

The first recording element substrate H1100 and the second recording element substrate H1101 are Si substrates, and a plurality of recording elements (nozzles) for ejecting an ink is formed on one surface of each substrate. Ink supply openings for supplying inks to a plurality of the ink flow paths are additionally formed so as to open to a back surface.

Figure 6:
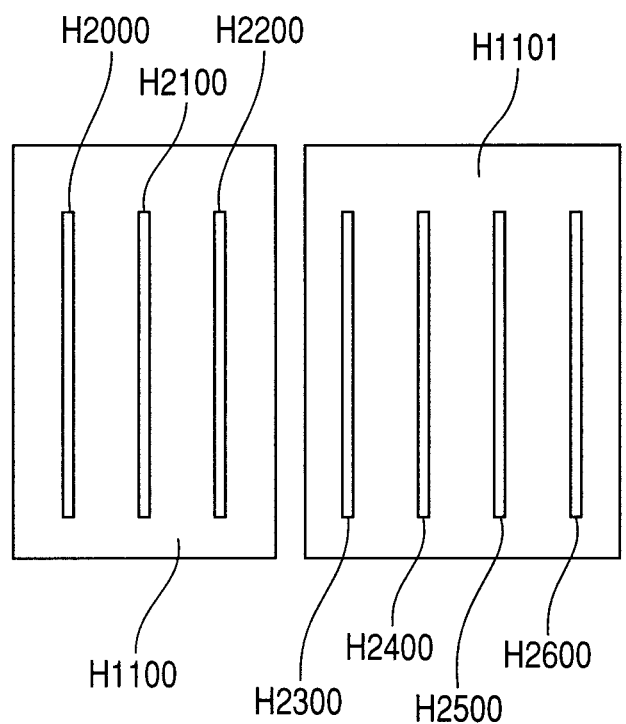
FIG. 6 is an elevational view illustrating recording element substrates in the head cartridge.

FIG. 6 is an enlarged elevational view illustrating the constructions of the first recording element substrate H1100 and the second recording element substrate H1101. Rows H2000 to H2600 of recording elements correspond to the respective inks of different colors.

Description will hereinafter be given with reference to FIGS. 4 and 5. The first recording element substrate H1100 and second recording element substrate H1101 are bonded and fixed to the first plate H1200. In the first plate, are formed ink supply openings H1201 for supplying inks to the first recording element substrate H1100 and second recording element substrate H1101. Further, the second plate H1400 having openings is bonded and fixed to the first plate H1200. This second plate H1400 holds the electric wiring substrate H1300 so as to electrically connect the electric wiring substrate H1300 to the first recording element substrate H1100 and second recording element substrate H1101.

The electric wiring substrate H1300 applies an electric signal for ejecting an ink from each nozzle formed in the first recording element substrate H1100 and second recording element substrate H1101. This electric wiring substrate H1300 has electric wirings corresponding to the first recording element substrate H1100 and second recording element substrate H1101, and external signal input terminals H1301 located at edges of the electric wirings for receiving electric signals from the ink jet recording apparatus. The external signal input terminals H1301 are positioned and fixed on to the back surface side of the cartridge holder H1500.

The flow path forming member H1600 is fixed to the cartridge holder H1500 for holding the ink cartridges H1900 to form ink flow paths H1501 linking from the ink cartridges H1900 to the first plate H1200. The filters H1700 are provided at ends on the ink cartridge side of the ink flow paths H1501 linking to the ink cartridges H1900 so as to prevent invasion of dusts from the outside. The sealing rubber H1800 is fitted to portions engaged with the ink cartridges H1900 so as to prevent evaporation of the inks from the engaged portions. The cartridge holder portion is bonded to the recording head portion H1001 by, for example, adhesion, thereby forming the head cartridge H1000.

The recording head of the thermal ink jet system in which recording is conducted using electrothermal converters (recording elements), which generate thermal energy for causing an ink to cause film boiling corresponding to an electric signal, has been described above. This system can be applied to either one of what are called an On-Demand type and a continuous type. It is particularly effective to apply the thermal ink jet system to the On-Demand type. In this case, the ejection of the ink which is excellent in responsiveness in particular can be achieved. It is therefore favorable to use such pulsed signals. The ink according to the present invention may also be favorably used in an ink jet recording apparatus of a system in which mechanical energy is applied to an ink to eject the ink, not limited to the thermal ink jet system.

EXAMPLES

The present invention will hereinafter be described in more detail by the following Examples and Comparative Examples. However, the present invention is not limited by the following examples unless going beyond the gist of the present invention. Incidentally, all designations of "part" or "parts" and "%" mean part or parts by mass and % by mass unless expressly noted.

<Synthesis of Polymer Fine Particle>

(Synthesis of Shell Polymer)

Respective shell polymers S1 to S36 were synthesized according to the following procedure. After 100.0 parts of ethylene glycol monobutyl ether was added into a four-neck flask equipped with a stirrer, a reflux condenser and a nitrogen gas inlet tube, nitrogen gas was introduced into the reaction system, and the reaction system was heated to a reaction temperature shown in Table 1 under stirring. A mixture of the monomers of the kinds and the parts by mass as shown in Table 1 and an ethylene glycol monobutyl ether solution of t-butyl peroxide (polymerization initiator) of the parts by mass as shown in Table 1 were dropped into this flask over 3 hours. Thereafter, aging was conducted for 2 hours, and ethylene glycol monobutyl ether was further removed under reduced pressure to obtain a solid polymer. Potassium hydroxide in an equivalent weight to the acid value of the polymer obtained in this manner and a proper amount of ion-exchanged water were added to the polymer to neutralize and dissolve the polymer, thereby obtaining an aqueous solution of a shell polymer, the content of solid (shell polymer) in which was 30%. The acid values and weight-average molecular weights of shell polymers S1 to S36 obtained in this manner are shown in Table 1.

TABLE 1

| Kind of shell polymer | Main properties of shell polymer ||||||||||
|---|---|---|---|---|---|---|---|---|---|---|
| | Compositional ratio of monomers (unit: parts) ||||||||||
| | nBA | tBA | HA | 2EHA | EA | MMA | nBMA | AA | MAA | Other monomers |
| S1 | | | | 38.0 | | 34.0 | | 28.0 | | |
| S2 | | | | 16.0 | | 16.0 | 40.0 | 28.0 | | |
| S3 | 35.0 | 13.0 | | | | 20.0 | | | 32.0 | |
| S4 | 35.0 | 15.0 | | | | 18.0 | | | 32.0 | |
| S5 | | | | | | 35.0 | 25.0 | 28.0 | | DA: 12.0 |

TABLE 1-continued

Main properties of shell polymer

| | c1 | c2 | c3 | c4 | c5 | c6 | Other |
|---|---|---|---|---|---|---|---|
| S6 | | | | | | 32.0 | NA: 33.0, EMA: 35.0 |
| S7 | 50.0 | | | | | 32.0 | tBMA: 18.0 |
| S8 | | 12.0 | | 53.0 | | 20.0 | EVE: 15.0 |
| S9 | | | 18.0 | | 44.0 | 28.0 | HDA: 10.0 |
| S10 | | | 32.0 | 20.0 | 20.0 | 28.0 | |
| S11 | | 28.0 | | | | 28.0 | HMA: 44.0 |
| S12 | | | 28.0 | | | 28.0 | 2EHMA: 44.0 |
| S13 | | | 18.0 | | | 18.0 | HDA: 10.0, 2EHMA: 54.0 |
| S14 | | | 22.0 | 38.0 | | 40.0 | |
| S15 | | | 24.0 | 38.0 | | 38.0 | |
| S16 | | | 25.0 | 67.0 | | 8.0 | |
| S17 | | | 16.0 | 30.0 | | 54.0 | |
| S18 | | | 20.0 | 30.0 | | 50.0 | |
| S19 | | | 32.0 | 60.0 | | 8.0 | |
| S20 | | | 33.0 | 60.0 | | 7.0 | |
| S21 | | | 37.0 | 35.0 | | 28.0 | |
| S22 | | | 37.0 | 35.0 | | 28.0 | |
| S23 | | | 37.0 | 35.0 | | 28.0 | |
| S24 | | | 37.0 | 35.0 | | 28.0 | |
| S25 | | 12.0 | 16.0 | 44.0 | | 28.0 | |
| S26 | | 6.0 | 20.0 | 46.0 | | 28.0 | |
| S27 | | | 30.0 | 40.0 | | | ATBS: 30.0 |
| S28 | | | 35.0 | 45.0 | | | PEMA: 20.0 |
| S29 | | | 32.0 | 48.0 | 10.0 | 10.0 | |
| S30 | | | 32.0 | 48.0 | | 20.0 | |
| S31 | | | 32.0 | 48.0 | | 20.0 | |
| S32 | | | 38.0 | 34.0 | | 28.0 | |
| S33 | | | 38.0 | 34.0 | | 28.0 | |
| S34 | | | 38.0 | 34.0 | | 28.0 | |
| S35 | | | 38.0 | 34.0 | | 28.0 | |
| S36 | 35.0 | | | 37.0 | | 28.0 | |

| Kind of shell polymer | Amount of polymerization initiator added (parts) | Reaction temp. (° C.) | Acid value of shell polymer (mg KOH/g) | Weight-average molecular weight of shell polymer |
|---|---|---|---|---|
| S1 | 1.30 | 110 | 216 | 15,000 |
| S2 | 1.30 | 110 | 220 | 16,000 |
| S3 | 1.30 | 110 | 214 | 15,000 |
| S4 | 1.30 | 110 | 213 | 16,000 |
| S5 | 1.30 | 110 | 213 | 14,000 |
| S6 | 1.30 | 110 | 207 | 13,000 |
| S7 | 1.30 | 110 | 203 | 14,000 |
| S8 | 1.30 | 110 | 158 | 13,000 |
| S9 | 1.30 | 110 | 217 | 15,000 |
| S10 | 1.30 | 110 | 219 | 14,000 |
| S11 | 1.30 | 110 | 222 | 15,000 |
| S12 | 1.30 | 110 | 215 | 15,000 |
| S13 | 1.30 | 110 | 146 | 14,000 |
| S14 | 1.30 | 110 | 317 | 14,000 |
| S15 | 1.30 | 110 | 295 | 15,000 |
| S16 | 1.30 | 110 | 62 | 15,000 |
| S17 | 1.30 | 110 | 421 | 15,000 |
| S18 | 1.30 | 110 | 390 | 16,000 |
| S19 | 1.30 | 110 | 62 | 14,000 |
| S20 | 1.30 | 110 | 55 | 14,000 |
| S21 | 0.40 | 110 | 215 | 52,000 |
| S22 | 0.45 | 110 | 216 | 50,000 |
| S23 | 6.00 | 110 | 215 | 3,000 |
| S24 | 7.00 | 110 | 218 | 2,500 |
| S25 | 1.30 | 110 | 215 | 17,000 |
| S26 | 1.30 | 110 | 215 | 15,000 |
| S27 | 1.30 | 110 | 82 | 6,200 |
| S28 | 1.30 | 110 | 109 | 6,500 |
| S29 | 1.30 | 110 | 143 | 15,000 |
| S30 | 1.30 | 110 | 161 | 14,000 |
| S31 | 1.30 | 110 | 133 | 16,000 |
| S32 | 0.47 | 110 | 214 | 42,000 |

TABLE 1-continued

| | Main properties of shell polymer | | | |
|---|---|---|---|---|
| S33 | 0.60 | 110 | 215 | 30,000 |
| S34 | 1.30 | 110 | 214 | 5,900 |
| S35 | 1.30 | 110 | 214 | 4,300 |
| S36 | 1.30 | 110 | 133 | 14,000 | nBA: n-butyl acrylate, tBA: t-butyl acrylate, HA: hexyl acrylate, NA: nonyl acrylate, 2EHA: 2-ethylhexyl acrylate, DA: n-dodecyl acrylate, EA: ethyl acrylate, HDA: hexadecyl acrylate, MMA: methyl methacrylate, EMA: ethyl methacrylate, nBMA: n-butyl methacrylate, tBMA: t-butyl methacrylate, HMA: hexyl methacrylate, 2EHMA: 2-ethylhexyl methacrylate, EVE: vinyl ethyl ether, AA: acrylic acid, MAA: methacrylic acid, ATBS: acrylamide-t-butylsulfonic acid, PEMA: 2-phosphonic acid ethyl methacrylate.

(Synthesis of Polymer Fine Particle Having Core-Shell Structure)

Polymer fine particle P1 to P46 having a core-shell structure were synthesized according to the following procedure. After an aqueous solution of each shell polymer obtained above was added into a four-neck flask equipped with a stirrer, a reflux condenser and a nitrogen gas inlet tube in such a manner that the solid content of the polymer amounted to the part by mass as shown in Table 2, nitrogen gas was introduced into the reaction system, and the reaction system was heated to a reaction temperature shown in Table 2 under stirring. A mixture of the monomers of the kinds and parts by mass as shown in Table 2 and a solution with potassium persulfate (polymerization initiator) of the parts by mass as shown in Table 2 dissolved in 16.7 parts of water were dropped into this flask over 3 hours. After aging was conducted for 2 hours, the solid content in the resultant mixture was controlled with a proper amount of ion-exchanged water to obtain an aqueous dispersion of polymer fine particles having a core-shell structure, the content of solids (polymer fine particle having the core-shell structure) in which was 25%. The thus-obtained polymer fine particles having the core-shell structure had such a structure that a core polymer was coated with a shell polymer.

TABLE 2

| | | | Main properties of core polymer | | | | | | | |
|---|---|---|---|---|---|---|---|---|---|---|
| Kind of polymer fine particle | Shell polymer | | Core polymer | | | | | | | |
| | Kind | Amount prepared (parts) | Compositional ratio of monomers (unit: parts) | | | | | | | |
| | | | nBA | tBA | HA | 2EHA | DA | EA | MMA | nBMA |
| P1 | S1 | 60.0 | | | | 20.0 | | | 80.0 | |
| P2 | S2 | 70.0 | | | | 15.0 | | | 25.0 | 60.0 |
| P3 | S2 | 70.0 | | | | 20.0 | | | | 80.0 |
| P4 | S3 | 70.0 | 45.0 | 10.0 | | | | | | |
| P5 | S4 | 70.0 | 45.0 | 10.0 | | | | | | |
| P6 | S5 | 65.0 | | | 20.0 | | 40.0 | | | 20.0 |
| P7 | S6 | 60.0 | | | | | | | 50.0 | |
| P8 | S7 | 70.0 | | 15.0 | | | 25.0 | | | |
| P9 | S8 | 60.0 | | 40.0 | | | | | | |
| P10 | S9 | 60.0 | | | | | | 10.0 | 20.0 | 60.0 |
| P11 | S10 | 60.0 | | | | | | 20.0 | 30.0 | 40.0 |
| P12 | S11 | 60.0 | | | 20.0 | | | | | |
| P13 | S11 | 60.0 | | | 20.0 | | | | | |
| P14 | S12 | 60.0 | | | | | | 20.0 | | |
| P15 | S13 | 70.0 | | | | | | 20.0 | | |
| P16 | S14 | 70.0 | | | | 20.0 | | | 20.0 | 60.0 |
| P17 | S15 | 65.0 | | | | 25.0 | | | 30.0 | 45.0 |
| P18 | S16 | 70.0 | 30.0 | | | 30.0 | 10.0 | | 30.0 | |
| P19 | S16 | 55.0 | 30.0 | | | 30.0 | | | 40.0 | |
| P20 | S17 | 42.0 | | | | 20.0 | | | 25.0 | 55.0 |
| P21 | S18 | 48.0 | | | | 20.0 | | | 25.0 | 55.0 |
| P22 | S19 | 75.0 | | | | 20.0 | | | 80.0 | |
| P23 | S20 | 75.0 | | | | 20.0 | | | 80.0 | |
| P24 | S1 | 37.0 | | | | 20.0 | | | 80.0 | |
| P25 | S1 | 40.0 | | | | 20.0 | | | 80.0 | |
| P26 | S1 | 75.0 | | | | 20.0 | | | 80.0 | |
| P27 | S1 | 80.0 | | | | 20.0 | | | 80.0 | |
| P28 | S21 | 60.0 | | | | 20.0 | | | 80.0 | |
| P29 | S22 | 60.0 | | | | 20.0 | | | 80.0 | |
| P30 | S23 | 60.0 | | | | 20.0 | | | 80.0 | |
| P31 | S24 | 60.0 | | | | 20.0 | | | 80.0 | |
| P32 | S25 | 60.0 | | | | 20.0 | | | 80.0 | |
| P33 | S26 | 70.0 | | | | 20.0 | | | 80.0 | |
| P34 | S27 | 60.0 | | | | 30.0 | | | 40.0 | 30.0 |
| P35 | S28 | 60.0 | | | | 35.0 | | | 65.0 | |
| P36 | S29 | 60.0 | | | | 15.0 | | | 30.0 | 35.0 |
| P37 | S30 | 60.0 | | | | 25.0 | | | 65.0 | |
| P38 | S31 | 60.0 | | 15.0 | | 30.0 | | | 45.0 | |

TABLE 2-continued

| | | Main properties of core polymer | | | |
|---|---|---|---|---|---|
| P39 | S32 | 60.0 | | 20.0 | 80.0 |
| P40 | S33 | 60.0 | | 20.0 | 80.0 |
| P41 | S34 | 60.0 | | 20.0 | 80.0 |
| P42 | S35 | 60.0 | | 20.0 | 80.0 |
| P43 | S36 | 60.0 | 80.0 | | |
| P44 | S36 | 60.0 | 75.0 | | |
| P45 | S36 | 60.0 | 80.0 | | |
| P46 | S36 | 60.0 | 75.0 | | |

| | Core polymer | | | | |
|---|---|---|---|---|---|
| Kind of polymer fine particle | Compositional ratio of monomers (unit: parts) | | Amount prepared (parts) | Amount of polymerization initiator added (parts) | Reaction temperature (° C.) |
| | tBMA | Other monomers | | | |
| P1 | | | 40.0 | 1.0 | 80 |
| P2 | | | 30.0 | 1.0 | 80 |
| P3 | | | 30.0 | 1.0 | 80 |
| P4 | 45.0 | | 30.0 | 1.0 | 80 |
| P5 | 45.0 | | 30.0 | 1.0 | 80 |
| P6 | | EMA: 20.0 | 35.0 | 1.0 | 80 |
| P7 | | NA: 50.0 | 40.0 | 1.0 | 80 |
| P8 | 60.0 | | 30.0 | 1.0 | 80 |
| P9 | | EMA: 40.0, EVE: 20.0 | 40.0 | 1.0 | 80 |
| P10 | | HDA: 10.0 | 40.0 | 1.0 | 80 |
| P11 | | HDA: 10.0 | 40.0 | 1.0 | 80 |
| P12 | | HMA: 80.0 | 40.0 | 1.0 | 80 |
| P13 | | 2EHMA: 80.0 | 40.0 | 1.0 | 80 |
| P14 | | HMA: 80.0 | 40.0 | 1.0 | 80 |
| P15 | | HDA: 20.0, 2EHMA: 60.0 | 30.0 | 1.0 | 80 |
| P16 | | | 30.0 | 1.0 | 80 |
| P17 | | | 35.0 | 1.0 | 80 |
| P18 | | | 30.0 | 1.0 | 80 |
| P19 | | | 45.0 | 1.0 | 80 |
| P20 | | | 58.0 | 1.0 | 80 |
| P21 | | | 52.0 | 1.0 | 80 |
| P22 | | | 25.00 | 1.0 | 80 |
| P23 | | | 25.0 | 1.0 | 80 |
| P24 | | | 63.0 | 1.0 | 80 |
| P25 | | | 60.00 | 1.0 | 80 |
| P26 | | | 25.0 | 1.0 | 80 |
| P27 | | | 20.0 | 1.0 | 80 |
| P28 | | | 40.0 | 1.0 | 80 |
| P29 | | | 40.0 | 1.0 | 80 |
| P30 | | | 40.0 | 1.0 | 80 |
| P31 | | | 40.0 | 1.0 | 80 |
| P32 | | | 40.0 | 1.0 | 80 |
| P33 | | | 30.0 | 1.0 | 80 |
| P34 | | | 40.0 | 1.0 | 80 |
| P35 | | | 40.0 | 1.0 | 80 |
| P36 | | AA: 10.0, MAA: 10.0 | 40.0 | 1.0 | 80 |
| P37 | | AA: 10.0 | 40.0 | 1.0 | 80 |
| P38 | | MAA: 10.0 | 40.0 | 1.0 | 80 |
| P39 | | | 40.0 | 0.4 | 80 |
| P40 | | | 40.0 | 0.5 | 80 |
| P41 | | | 40.0 | 1.5 | 80 |
| P42 | | | 40.0 | 1.6 | 80 |
| P43 | | St: 20.0 | 40.0 | 1.0 | 80 |
| P44 | | St: 25.0 | 40.0 | 1.0 | 80 |
| P45 | | BzMA: 20.0 | 40.0 | 1.0 | 80 |
| P46 | | BzMA: 25.0 | 40.0 | 1.0 | 80 |

St: styrene, BzMA: benzyl methacrylate, other abbreviations are the same as in Table 1.

(Main Properties of Polymer Fine Particle Having Core-Shell Structure)

The main properties of the above-obtained polymer fine particle P1 to P46 having the core-shell structure are shown in Table 3. Incidentally, abbreviations for monomers in Table 3s are the same as in Tables 1 and 2.

TABLE 3

| Kind of polymer fine particle | Kind of shell polymer charged | Compositional ratio of monomers in polymer fine particle (unit: parts) | | | | | | | | | |
|---|---|---|---|---|---|---|---|---|---|---|---|
| | | nBA | tBA | HA | 2EHA | DA | EA | MMA | EMA | nBMA | tBMA | HMA |
| P1 | S1 | | | | 30.8 | | | 52.4 | | | | |
| P2 | S2 | | | | 15.7 | | | 18.7 | | 46.0 | | |
| P3 | S2 | | | | 17.2 | | | 11.2 | | 52.0 | | |
| P4 | S3 | 38.0 | 12.1 | | | | | | | 14.0 | 13.5 | |
| P5 | S4 | 38.0 | 13.5 | | | | | | | 12.6 | 13.5 | |
| P6 | S5 | | | 7.0 | | 21.8 | | 22.8 | 7.0 | 23.2 | | |
| P7 | S6 | | | | | | | 20.0 | 21.0 | | | |
| P8 | S7 | | 4.5 | 35.0 | | 7.5 | | | | | 30.6 | |
| P9 | S8 | | | 16.0 | 7.2 | | | 31.8 | 16.0 | | | |
| P10 | S9 | | | | | | 14.8 | 8.0 | | 50.4 | | |
| P11 | S10 | | | | | | 27.2 | 24.0 | | 28.0 | | |
| P12 | S11 | | | 8.0 | 16.8 | | | | | | | 58.4 |
| P13 | S11 | | | 8.0 | 16.8 | | | | | | | 26.4 |
| P14 | S12 | | | | | | 24.8 | | | | | 32.0 |
| P15 | S13 | | | | | | 18.6 | | | | | |
| P16 | S14 | | | | 21.4 | | | 32.6 | | 18.0 | | |
| P17 | S15 | | | | 24.4 | | | 35.2 | | 15.7 | | |
| P18 | S16 | | 9.0 | | 26.5 | 3.0 | | 55.9 | | | | |
| P19 | S16 | | 13.5 | | 27.3 | | | 54.8 | | | | |
| P20 | S17 | | | | 18.3 | | | 27.1 | | 31.9 | | |
| P21 | S18 | | | | 20.0 | | | 27.4 | | 28.6 | | |
| P22 | S19 | | | | 29.0 | | | 65.0 | | | | |
| P23 | S20 | | | | 29.7 | | | 65.0 | | | | |
| P24 | S1 | | | | 26.6 | | | 63.0 | | | | |
| P25 | S1 | | | | 27.2 | | | 61.6 | | | | |
| P26 | S1 | | | | 33.5 | | | 45.5 | | | | |
| P27 | S1 | | | | 34.4 | | | 43.2 | | | | |
| P28 | S21 | | | | 30.2 | | | 53.0 | | | | |
| P29 | S22 | | | | 30.2 | | | 53.0 | | | | |
| P30 | S23 | | | | 30.2 | | | 53.0 | | | | |
| P31 | S24 | | | | 30.2 | | | 53.0 | | | | |
| P32 | S25 | | 7.2 | | 17.6 | | | 58.4 | | | | |
| P33 | S26 | | 4.2 | | 20.0 | | | 56.2 | | | | |
| P34 | S27 | | | | 30.0 | | | 40.0 | | 12.0 | | |
| P35 | S28 | | | | 35.0 | | | 53.0 | | | | |
| P36 | S29 | | | | 25.2 | | | 40.8 | | 14.0 | | |
| P37 | S30 | | | | 29.2 | | | 54.8 | | | | |
| P38 | S31 | | 6.0 | | 31.2 | | | 46.8 | | | | |
| P39 | S32 | | | | 30.8 | | | 52.4 | | | | |
| P40 | S33 | | | | 30.8 | | | 52.4 | | | | |
| P41 | S34 | | | | 30.8 | | | 52.4 | | | | |
| P42 | S35 | | | | 30.8 | | | 52.4 | | | | |
| P43 | S36 | 53.0 | | | | | | 22.2 | | | | |
| P44 | S36 | 51.0 | | | | | | 22.2 | | | | |
| P45 | S36 | 53.0 | | | | | | 22.2 | | | | |
| P46 | S36 | 51.0 | | | | | | 22.2 | | | | |

| Kind of polymer fine particle | Compositional ratio of monomers in polymer fine particle (unit: parts) | | | | Main properties of polymer fine particles having core-shell structure | | | |
|---|---|---|---|---|---|---|---|---|
| | 2EHMA | AA | MAA | Other monomers | Acid value (mg KOH/g) | Core shell ratio (*1) | Minimum film formation temp. (° C.) | Volume-average particle size (nm) |
| P1 | | 16.8 | | | 131 | 0.67 | <5 | 79 |
| P2 | | 19.6 | | | 153 | 0.43 | <5 | 80 |
| P3 | | 19.6 | | | 153 | 0.43 | <5 | 75 |
| P4 | | | 22.4 | | 146 | 0.43 | <5 | 83 |
| P5 | | | 22.4 | | 146 | 0.43 | <5 | 94 |
| P6 | | 18.2 | | | 142 | 0.54 | <5 | 89 |
| P7 | | | 19.2 | NA: 39.8 | 125 | 0.67 | <5 | 86 |
| P8 | | | 22.4 | | 146 | 0.43 | <5 | 94 |

TABLE 3-continued

Main properties of polymer fine particle

| | | | | | | |
|---|---|---|---|---|---|---|
| P9 | | 12.0 | EVA: 17.0 | 94 | 0.67 | <5 | 98 |
| P10 | | 16.8 | HDA: 10.0 | 131 | 0.67 | 7 | 82 |
| P11 | | 16.8 | HDA: 4.0 | 131 | 0.67 | 10 | 85 |
| P12 | | 16.8 | | 131 | 0.67 | <5 | 88 |
| P13 | 32.0 | 16.8 | | 131 | 0.67 | <5 | 79 |
| P14 | 26.4 | 16.8 | | 131 | 0.67 | <5 | 80 |
| P15 | 55.8 | 12.6 | HDA: 13.0 | 101 | 0.43 | 8 | 75 |
| P16 | | 28.0 | | 218 | 0.43 | 10 | 102 |
| P17 | | 24.7 | | 192 | 0.54 | <5 | 98 |
| P18 | | 5.6 | | 44 | 0.43 | <5 | 80 |
| P19 | | 4.4 | | 34 | 0.82 | <5 | 78 |
| P20 | | 22.7 | | 177 | 1.38 | 8 | 101 |
| P21 | | 24.0 | | 187 | 1.08 | <5 | 91 |
| P22 | | 6.0 | | 47 | 0.33 | <5 | 82 |
| P23 | | 5.3 | | 41 | 0.33 | <5 | 83 |
| P24 | | 10.4 | | 81 | 1.70 | 11 | 83 |
| P25 | | 11.2 | | 87 | 1.50 | 10 | 86 |
| P26 | | 21.0 | | 164 | 0.33 | <5 | 85 |
| P27 | | 22.4 | | 175 | 0.25 | <5 | 87 |
| P28 | | 16.8 | | 131 | 0.67 | <5 | 169 |
| P29 | | 16.8 | | 131 | 0.67 | <5 | 172 |
| P30 | | 16.8 | | 131 | 0.67 | <5 | 64 |
| P31 | | 16.8 | | 131 | 0.67 | <5 | 56 |
| P32 | | 16.8 | | 131 | 0.67 | 29 | 65 |
| P33 | | 19.6 | | 153 | 0.43 | 24 | 70 |
| P34 | | | ATBS: 18.0 | 49 | 0.67 | <5 | 91 |
| P35 | | | PEMA: 12.0 | 65 | 0.67 | <5 | 95 |
| P36 | | 10.0 | 10.0 | 143 | 0.67 | 9 | 90 |
| P37 | | 16.0 | | 125 | 0.67 | <5 | 93 |
| P38 | | | 16.0 | 104 | 0.67 | <5 | 83 |
| P39 | | 16.8 | | 131 | 0.67 | <5 | 218 |
| P40 | | 16.8 | | 131 | 0.67 | <5 | 195 |
| P41 | | 16.8 | | 131 | 0.67 | <5 | 32 |
| P42 | | 16.8 | | 131 | 0.67 | <5 | 25 |
| P43 | | 16.8 | St: 8.0 | 131 | 0.67 | <5 | 63 |
| P44 | | 16.8 | St: 10.0 | 153 | 0.67 | <5 | 69 |
| P45 | | 16.8 | BzMA: 8.0 | 153 | 0.67 | <5 | 64 |
| P46 | | 16.8 | BzMA: 10.0 | 146 | 0.67 | <5 | 67 |

Abbreviations are the same as in Tables 1 and 2.
(*1) Mass ratio of core polymer to shell polymer.

(Synthesis of Single Layer Polymer Fine Particle P47)

Polymer fine particle P47 was synthesized according to the following procedure. The polymer fine particle P47 is single layer polymer fine particle used in a clear ink for Comparative Examples. After 100.0 parts of water was added into a four-neck flask equipped with a stirrer, a reflux condenser and a nitrogen gas inlet tube, nitrogen gas was introduced into the reaction system, and the reaction system was heated to 80° C. under stirring. One hundred parts of water, 1.0 part of sodium lauryl sulfate (emulsifier), 24.8 parts of 2-ethylhexyl acrylate, 58.4 parts of methyl methacrylate and 16.8 parts of acrylic acid were mixed to prepare an emulsion of the monomers. The emulsion of the monomers and 10.0 parts of a 5% aqueous solution of potassium persulfate were dropped into the flask over 3 hours.

After aging was conducted for 2 hours, the solid content in the resultant mixture was controlled with a proper amount of ion-exchanged water to obtain an aqueous dispersion of single layer polymer fine particles, the content of solids (single layer polymer fine particle) in which was 25%. With respect to the main properties of the thus-obtained polymer fine particle P47, the acid value was 128 mg KOH/g, the minimum film formation temperature was 12° C., and the volume-average particle size was 101 nm.

(Synthesis of Polymer Fine Particle P48 Having Core-Shell Structure Different in Synthetic Process)

Polymer fine particle P48 having a core-shell structure was synthesized according to the following procedure. The polymer fine particle P48 is those synthesized according to a process different from the synthetic process of the polymer fine particle specified in the present invention and used in a clear ink for Comparative Examples. After 100.0 parts of water was added into a four-neck flask equipped with a stirrer, a reflux condenser and a nitrogen gas inlet tube, nitrogen gas was introduced into the reaction system, and the reaction system was heated to 80° C. under stirring. Forty parts of water, 0.4 parts of sodium lauryl sulfate, 8.0 parts of 2-ethylhexyl acrylate and 32.0 parts of methyl methacrylate were mixed to prepare an emulsion A of the monomers.

Sixty parts of water, 0.6 parts of sodium lauryl sulfate, 16.8 parts of 2-ethylhexyl acrylate, 26.4 parts of methyl methacrylate and 16.8 parts of acrylic acid were mixed to prepare an emulsion B of the monomers. The emulsion A of the monomers and 4.0 parts of a 5% aqueous solution of potassium persulfate were dropped into the flask over 1 hour. Aging was conducted for 2 hours to synthesize polymer fine particle, which will become a core polymer. Thereafter, the emulsion B of the monomers and 15.0 parts of a 5% aqueous solution of potassium persulfate were dropped into the same flask over 1 hour. After aging was conducted for 2 hours, the solid content in the resultant mixture was controlled with a proper amount of ion-exchanged water to obtain an aqueous dispersion of polymer fine particles P48 having a core-shell structure, the content of solids (polymer fine particle having the core-shell structure) in which was 25%. With respect to the main properties of the thus-obtained polymer fine particle P48 having the core-shell structure, the acid value was 127 mg KOH/g, the minimum film formation temperature was 8° C., and the volume-average particle size was 110 nm.

Incidentally, the main properties of the shell polymer in the polymer fine particle P48 were determined in the following manner. After 100.0 parts of water was added into a four-neck flask equipped with a stirrer, a reflux condenser and a nitrogen gas inlet tube, nitrogen gas was introduced into the reaction system, and the reaction system was heated to 80° C. under stirring. The same emulsion B of the monomers as described above and 15.0 parts of a 5% aqueous solution of potassium persulfate were dropped into this flask over 1 hour, and aging was conducted for 2 hours to obtain a shell polymer S37. The main properties of the thus-obtained shell polymer S37 were determined. As a result, the acid value was 220 mg KOH/g, and the weight-average molecular weight was 14,000.

(Synthesis of Polymer Fine Particle P49 Having Core-Shell Structure Different in Synthetic Process)

Polymer fine particle P49 having a core-shell structure was synthesized according to the following procedure. The polymer fine particle P49 is those synthesized according to a process in which other polymers are used in addition to the two monomers recited in the present invention and which is different from the synthetic process of the polymer fine particle specified in the present invention, and used in a clear ink for Comparative Examples. Specifically, synthesis was conducted according to the synthetic process of the emulsion D in Japanese Patent Application Laid-Open No. 2003-335058, and the solid content in the resultant emulsion was controlled with a proper amount of ion-exchanged water to obtain an aqueous dispersion of polymer fine particles P49 having a core-shell structure, the content of solids (polymer fine particle having the core-shell structure) in which was 25%. With respect to the main properties of the thus-obtained polymer fine particle P49 having the core-shell structure, the acid value was 40 mg KOH/g, the minimum film formation temperature was less than 5° C., and the volume-average particle size was 98 nm.

(Synthesis of Single Layer Polymer Fine Particle P50)

Single layer polymer fine particle P50 was synthesized according to the following procedure. The polymer fine particle P50 is single layer polymer fine particle synthesized by using other polymers in addition to the two monomers recited in the present invention and used in a clear ink for Comparative Examples. Specifically, synthesis was conducted according to the synthetic process of the emulsion A in Japanese Patent Application Laid-Open No. 2003-335058, and the solid content in the resultant emulsion was controlled with a proper amount of ion-exchanged water to obtain an aqueous dispersion of single layer polymer fine particles P50, the content of solids (single layer polymer fine particle) in which was 25%. With respect to the main properties of the thus-obtained single layer polymer fine particle P50, the acid value was 36 mg KOH/g, the minimum film formation temperature was less than 5° C., and the volume-average particle size was 92 nm.

(Synthesis of Polymer Fine Particle P51 Having Core-Shell Structure Different in Synthetic Process)

Polymer fine particle P51 having a core-shell structure was synthesized according to the following procedure. The polymer fine particle P51 is those synthesized according to a process different from the synthetic process of the polymer fine particle specified in the present invention and used in a clear ink for Comparative Examples. Specifically, after a core polymer was polymerized in the presence of an emulsifier without using a monomer selected from an α,β-ethylenically unsaturated acid monomer and a salt thereof, a shell polymer was polymerized, and a unit derived from a bifunctional monomer was used in the shell polymer to cross-link it under heating. Specifically, the synthesis was conducted according to the synthetic process in Example 2 of Japanese Patent Application Laid-Open No. 2004-211089 to obtain an aqueous dispersion of polymer fine particles P51. The composition of the core polymer is as follows: 17.5 parts of methyl methacrylate and 17.5 parts of hexyl acrylate.

The composition of the shell polymer is as follows: 29.2 parts of methyl methacrylate, 29.2 parts of hexyl acrylate, 0.6 parts of ethylene glycol dimethacrylate and 6.0 parts of methacryloyloxyethyl succinate. As the emulsifier, was used a 30% aqueous solution of Rhodafac RS 710 (product of Rhodia Novecare Co.). Thereafter, the solid content was controlled with a proper amount of ion-exchanged water to obtain an aqueous dispersion of polymer fine particles P51 having a core-shell structure, the content of solids (polymer fine particle having the core-shell structure) in which was 25%. With respect to the main properties of the thus-obtained polymer fine particle P51 having the core-shell structure, the core/shell ratio was 0.54, the minimum film formation temperature was less than 5° C., and the volume-average particle size was 210 nm.

(Synthesis of Polymer Fine Particle P52 Having Core-Shell Structure Different in Synthetic Process)

Polymer fine particle P52 having a core-shell structure was synthesized according to the following procedure. The polymer fine particle P52 is those synthesized according to a process in which other polymers are used in addition to the two monomers recited in the present invention and which is different from the synthetic process of the polymer fine particle specified in the present invention and used in a clear ink for Comparative Examples. Specifically, synthesis was conducted according to the synthetic process in Preparation Example 1 of Japanese Patent Application Laid-Open No. 2008-179778 to obtain an aqueous dispersion of polymer fine particles P52. In the synthesis of a core polymer, 6.4 parts of divinylbenzene (DVB-810; product of Nippon Steel Chemical Co., Ltd.) having a purity of 81% was used per 100 parts of styrene. The composition of a shell polymer is as follows: parts of a styrene macromonomer (AS-6; product of TOAG-OSEI CO., LTD.), 38 parts of benzyl methacrylate, 10 parts of stearyl methacrylate, 15 parts of polypropylene glycol monomethacrylate (PP-500; product of NOF CORPORATION), 15 parts of polyethylene glycol monomethacrylate (NK ESTER M-90G; product of Shin-Nakamura Chemical Co., Ltd.) and 12 parts of methacrylic acid. After the synthesis, 4 parts of a cross-linking agent (DENACOL EX-321; product of Nagase Chemtex Corporation) was caused to react with 100 parts of the polymer to cross-link the polymer.

Thereafter, the solid content was controlled with a proper amount of ion-exchanged water to obtain an aqueous dispersion of polymer fine particles P52 having a core-shell structure, the content of solids (polymer fine particle having the core-shell structure) in which was 25%. With respect to the main properties of the thus-obtained polymer fine particle P52, the acid value was 20 mg KOH/g, the core/shell ratio was 2.81, the minimum film formation temperature was 50° C., and the volume-average particle size was 500 nm. With respect to the main properties of the shell polymer, the acid value was 75 mg KOH/g, and the weight-average molecular weight was 180,000.

<Preparation of Clear Ink>

After the respective components shown in Table 4 were mixed, the resultant mixtures were filtered under pressure through a membrane filter (HDC II Filter; manufactured by PALL Corporation.) having a pore size of 1.2 μm, thereby preparing the respective clear inks for Examples and Comparative Examples. Incidentally, JONCRYL 683 (product of Johnson Polymer Co.) is a styrene-acrylic acid copolymer and was used as a polymer different from the polymer fine particle contained in the clear ink according to the present invention. JONCRYL 683 was used as an aqueous solution the content of solids in which was 20.0% including that neutralized with potassium hydroxide in an equivalent weight to the acid value. The thus-obtained respective clear inks of Examples are colorless, milk-white or white and do not contain a coloring material. The respective clear inks of Examples had no peak in the wavelength range of from 400 nm to 800 nm when the absorbance of each clear ink 50 times (by mass) diluted with pure water was measured, and the abs value in the range of from 400 nm to 800 nm was 1.0 or less.

TABLE 4

Composition of clear ink

| | Clear ink number | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Kind of polymer fine particle | P1 | P2 | P3 | P4 | P5 | P6 | P7 | P8 | P9 | P10 | P11 | P12 | P13 | P14 | P15 | P16 |
| Aqueous dispersion of polymer fine particles | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| Glycerol | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 |
| Polyethylene glycol (*1) | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
| Trimethylolpropane | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
| Triethylene glycol monobutyl ether | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 |
| Acetylenol E100 (*2) | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Joncryl 683 (*3) | | | | | | | | | | | | | | | | |
| Ion-exchanged water | 69.5 | 69.5 | 69.5 | 69.5 | 69.5 | 69.5 | 69.5 | 69.5 | 69.5 | 69.5 | 69.5 | 69.5 | 69.5 | 69.5 | 69.5 | 69.5 |

| | Clear ink number | | | | | | | | | | | | | | | |
|---|---|---|---|---|---|---|---|---|---|---|---|---|---|---|---|---|
| | 17 | 18 | 19 | 20 | 21 | 22 | 23 | 24 | 25 | 26 | 27 | 28 | 29 | 30 | 31 | |
| Kind of polymer fine particle | P17 | P18 | P19 | P20 | P21 | P22 | P23 | P24 | P25 | P26 | P27 | P28 | P29 | P30 | P31 | |
| Aqueous dispersion of polymer fine particles | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | |
| Glycerol | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | |
| Polyethylene glycol (*1) | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 | |
| Trimethylolpropane | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 | |
| Triethylene glycol monobutyl ether | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 | |
| Acetylenol E100 (*2) | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | |
| Joncryl 683 (*3) | | | | | | | | | | | | | | | | |
| Ion-exchanged water | 69.5 | 69.5 | 69.5 | 69.5 | 69.5 | 69.5 | 69.5 | 69.5 | 69.5 | 69.5 | 69.5 | 69.5 | 69.5 | 69.5 | 69.5 | |

| | Clear ink number | | | | | | | | | | | | | | | |
|---|---|---|---|---|---|---|---|---|---|---|---|---|---|---|---|---|
| | 32 | 33 | 34 | 35 | 36 | 37 | 38 | 39 | 40 | 41 | 42 | 43 | 44 | 45 | 46 | |
| Kind of polymer fine particle | P32 | P33 | P34 | P35 | P36 | P37 | P38 | P39 | P40 | P41 | P42 | P1 | P1 | P1 | P1 | |
| Aqueous dispersion of polymer fine particles | 10.0 | 10.0 | 10.0 | 10.0 | 10.0 | 10.0 | 10.0 | 10.0 | 10.0 | 10.0 | 10.0 | 21.2 | 20.0 | 1.2 | 1.0 | |
| Glycerol | 7.0 | 7.0 | 7.0 | 7.0 | 7.0 | 7.0 | 7.0 | 7.0 | 7.0 | 7.0 | 7.0 | 7.0 | 7.0 | 7.0 | 7.0 | |
| Polyethylene glycol (*1) | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 | |
| Trimethylolpropane | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 | |
| Triethylene glycol monobutyl ether | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 | |
| Acetylenol E100 (*2) | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | |
| Joncryl 683 (*3) | | | | | | | | | | | | | | | | |
| Ion-exchanged water | 69.5 | 69.5 | 69.5 | 69.5 | 69.5 | 69.5 | 69.5 | 69.5 | 69.5 | 69.5 | 69.5 | 58.3 | 59.5 | 78.3 | 78.5 | |

| | Clear ink number | | | | | | | | | | | | | |
|---|---|---|---|---|---|---|---|---|---|---|---|---|---|---|
| | 47 | 48 | 49 | 50 | 51 | 52 | 53 | 54 | 55 | 56 | 57 | 58 | 59 | 60 |
| Kind of polymer fine particle | P1 | P1 | P1 | P1 | P43 | P44 | P45 | P46 | P47 | P48 | P49 | P50 | P51 | P52 |
| Aqueous dispersion of polymer fine particles | 7.5 | 2.5 | 7.5 | 2.5 | 10.0 | 10.0 | 10.0 | 10.0 | 10.0 | 10.0 | 10.0 | 10.0 | 10.0 | 10.0 |

TABLE 4-continued

| Composition of clear ink | | | | | | | | | | | | | | |
|---|---|---|---|---|---|---|---|---|---|---|---|---|---|---|
| Glycerol | 7.0 | 7.0 | 7.0 | 7.0 | 7.0 | 7.0 | 7.0 | 7.0 | 7.0 | 7.0 | 7.0 | 7.0 | 7.0 | 7.0 |
| Polyethylene glycol (*1) | 5.0 | 5.0 | 5.0 | 5.0 | 5.0 | 5.0 | 5.0 | 5.0 | 5.0 | 5.0 | 5.0 | 5.0 | 5.0 | 5.0 |
| Trimethylolpropane | 5.0 | 5.0 | 5.0 | 5.0 | 5.0 | 5.0 | 5.0 | 5.0 | 5.0 | 5.0 | 5.0 | 5.0 | 5.0 | 5.0 |
| Triethylene glycol monobutyl ether | 3.0 | 3.0 | 3.0 | 3.0 | 3.0 | 3.0 | 3.0 | 3.0 | 3.0 | 3.0 | 3.0 | 3.0 | 3.0 | 3.0 |
| Acetylenol E100 (*2) | 0.5 | 0.5 | 0.5 | 0.5 | 0.5 | 0.5 | 0.5 | 0.5 | 0.5 | 0.5 | 0.5 | 0.5 | 0.5 | 0.5 |
| Joncryl 683 (*3) | 3.2 | 9.4 | 2.5 | 10.0 | | | | | | | | | | |
| Ion-exchanged water | 68.8 | 67.6 | 69.5 | 67.0 | 69.5 | 69.5 | 69.5 | 69.5 | 69.5 | 69.5 | 69.5 | 69.5 | 69.5 | 69.5 |

(*1) Average molecular weight of 1,000;
(*2) Surfactant (product of Kawaken Fine Chemicals);
(*3) Aqueous solution having a solid content of 20.0% (product of Johnson polymer)

<Preparation of Pigment Dispersion>
(Preparation of Magenta Pigment Dispersion)

First, 20 parts of a pigment, 60 parts of an aqueous polymer solution (solid content: 20.0%) and 20 parts of water were placed in a bead mill (LMZ2; manufactured by Ashizawa Finetec Co.), the packing rate of beads having a diameter of 0.3 mm in which was controlled to 80%, and dispersed for 5 hours at a number of revolutions of 1,800 rpm. Incidentally, the pigment used was C.I. Pigment Red 122 (trade name: Toner Magenta E02; product of Clariant Co.). As the aqueous polymer solution, was used an aqueous solution the content of solids in which was 20.0% including that obtained by neutralizing JONCRYL 678 (product of Johnson Polymer) that is a styrene-acrylic acid copolymer with potassium hydroxide in an equivalent weight to the acid value thereof. Thereafter, the resultant dispersion was centrifuged for 30 minutes at a number of revolutions of 5,000 rpm, thereby removing aggregated components, and further diluted with ion-exchanged water to obtain a magenta pigment dispersion the pigment content in which was 15.0%.

(Preparation of Black Pigment Dispersion)

A black pigment dispersion, the pigment content in which was 15.0%, was obtained by the same procedure as in the preparation of the magenta pigment dispersion except that the pigment was changed to carbon black (trade name: Printex 90; product of Degussa Co.).

<Preparation of Pigment Ink>

After the respective components shown in Table 5 were mixed, the resultant mixtures were filtered under pressure through a membrane filter (HDC II Filter; manufactured by PALL Corporation.) having a pore size of 1.2 μm, thereby preparing the pigment inks 1 to 12. The thus-obtained pigment inks were separately put into an ink cartridge.

TABLE 5

| Composition of pigment ink (unit: %) | | | | | | | | | | | | |
|---|---|---|---|---|---|---|---|---|---|---|---|---|
| | Pigment ink number | | | | | | | | | | | |
| | 1 | 2 | 3 | 4 | 5 | 6 | 7 | 8 | 9 | 10 | 11 | 12 |
| Magenta pigment dispersion | 26.7 | 26.7 | 10.0 | 10.0 | 6.7 | 6.7 | | | | | | |
| Black pigment dispersion | | | | | | | 26.7 | 26.7 | 13.3 | 13.3 | 10.0 | 10.0 |
| Joncryl 678 (*1) | | | | | 2.5 | 2.5 | | | | | 2.5 | 2.5 |
| Aqueous dispersion of polymer fine particles P1 (*2) | 1.2 | | 1.2 | | 2.4 | | 1.2 | | 1.2 | | 2.4 | |
| Glycerol | 7.0 | 7.0 | 7.0 | 7.0 | 7.0 | 7.0 | 7.0 | 7.0 | 7.0 | 7.0 | 7.0 | 7.0 |
| Polyethylene glycol (*3) | 5.0 | 5.0 | 5.0 | 5.0 | 5.0 | 5.0 | 5.0 | 5.0 | 5.0 | 5.0 | 5.0 | 5.0 |
| Trimethylolpropane | 5.0 | 5.0 | 5.0 | 5.0 | 5.0 | 5.0 | 5.0 | 5.0 | 5.0 | 5.0 | 5.0 | 5.0 |
| Triethylene glycol monobutyl ether | 3.0 | 3.0 | 3.0 | 3.0 | 3.0 | 3.0 | 3.0 | 3.0 | 3.0 | 3.0 | 3.0 | 3.0 |
| Acetylenol E100 (*4) | 0.5 | 0.5 | 0.5 | 0.5 | 0.5 | 0.5 | 0.5 | 0.5 | 0.5 | 0.5 | 0.5 | 0.5 |
| Ion-exchanged water | 51.6 | 52.8 | 68.3 | 69.5 | 67.9 | 70.3 | 51.6 | 52.8 | 65.0 | 66.2 | 64.6 | 67.0 |
| Content of pigment | 4.0 | 4.0 | 1.5 | 1.5 | 1.0 | 1.0 | 4.0 | 4.0 | 2.0 | 2.0 | 1.5 | 1.5 |
| Content of polymer fine particle P1 | 0.3 | 0.0 | 0.3 | 0.0 | 0.6 | 0.0 | 0.3 | 0.0 | 0.3 | 0.0 | 0.6 | 0.0 |
| Note (kind of ink) | High concentration ink | | Medium concentration ink | | Low concentration ink | | High concentration ink | | Medium concentration ink | | Low concentration ink | |

(*1) Aqueous solution having a solid content of 20.0% (product of Johnson polymer Co.)
(*2) Content of polymer fine particle P1: 25.0%
(*3) Average molecular weight of 1,000
(*4) Surfactant (product of Kawaken Fine Chemicals)

<Evaluation>

Ink cartridges into which the respective clear inks and respective pigment inks obtained above had been separately charged were mounted in an ink jet recording apparatus (trade name: PIXUS Pro 9500; manufactured by Canon Inc.), which performs ejection by action of thermal energy. This ink jet recording apparatus is such that the case where eight ink droplets each having a mass of 3.5 ng (nanogram) are applied to a region of vertical resolution 600 dpi×horizontal resolution 600 dpi is regarded as 100% recording duty. Incidentally, as a result of the application of the respective clear inks of Examples to recording media, all these clear inks could form a colorless and transparent film. In the following evaluation, an OHP film was used as a recording medium for the purpose of making a colorless and transparent film formed by the clear ink easy to be observed. However, the recording medium to which the clear ink according to the present invention can be applied is not limited thereto. In addition, in the following evaluation, the kind (content of the pigment) of a pigment ink used is selected according to evaluation items for the purpose of making the effects of the present invention easy to be confirmed. However, the present invention is not limited to the following constitution of the pigment inks.

(Evaluation of Ejection Stability)

Each of the clear inks was used to continuously record a A4-sized solid image with a recording duty of 50% on 20 sheets of the recording medium (OHP film, CG3410; product of Sumitomo 3M Limited) by the above-described ink jet recording apparatus. Ejection stability of the clear ink was evaluated from the conditions of dot misalignment in the first sheet and the twentieth sheet, which were visually observed. The evaluation criteria of the ejection stability are as follows. The evaluation results are shown in Table 6. In the present invention, 'B' or more in the following evaluation criteria was regarded as an allowable level of ejection stability.

AA: Recording could be conducted on 20 sheets of the recording medium, and no dot misalignment was observed in the image on the twentieth sheet;

A: Recording could be conducted on 20 sheets of the recording medium, but dot misalignment was slightly observed in the image on the twentieth sheet;

B: Recording could be conducted on 20 sheets of the recording medium, but dot misalignment was conspicuous in the image on the twentieth sheet compared with the image on the first sheet;

C: Recording could not be conducted on 20 sheets of the recording medium.

TABLE 6

Evaluation results as to ejection stability of clear ink

|  | | Clear ink number | Evaluation result |
|---|---|---|---|
| Example | 1-1 | 1 | AA |
|  | 1-2 | 2 | AA |
|  | 1-3 | 3 | AA |
|  | 1-4 | 4 | AA |
|  | 1-5 | 5 | AA |
|  | 1-6 | 6 | AA |
|  | 1-7 | 7 | AA |
|  | 1-8 | 8 | AA |
|  | 1-9 | 9 | A |
|  | 1-10 | 10 | AA |
|  | 1-11 | 11 | AA |
|  | 1-12 | 12 | AA |
|  | 1-13 | 13 | AA |
|  | 1-14 | 14 | AA |
|  | 1-15 | 15 | A |
|  | 1-16 | 16 | AA |
|  | 1-17 | 17 | AA |
|  | 1-18 | 18 | A |
|  | 1-19 | 19 | B |
|  | 1-20 | 20 | AA |
|  | 1-21 | 21 | AA |
|  | 1-22 | 22 | A |

TABLE 6-continued

Evaluation results as to ejection stability of clear ink

|  | | Clear ink number | Evaluation result |
|---|---|---|---|
|  | 1-23 | 23 | B |
|  | 1-24 | 24 | B |
|  | 1-25 | 25 | A |
|  | 1-26 | 26 | AA |
|  | 1-27 | 27 | A |
|  | 1-28 | 28 | B |
|  | 1-29 | 29 | A |
|  | 1-30 | 30 | AA |
|  | 1-31 | 31 | A |
|  | 1-32 | 32 | A |
|  | 1-33 | 33 | A |
|  | 1-34 | 34 | B |
|  | 1-35 | 35 | B |
|  | 1-36 | 36 | AA |
|  | 1-37 | 37 | AA |
|  | 1-38 | 38 | A |
|  | 1-39 | 39 | B |
|  | 1-40 | 40 | A |
|  | 1-41 | 41 | AA |
|  | 1-42 | 42 | A |
|  | 1-43 | 43 | A |
|  | 1-44 | 44 | AA |
|  | 1-45 | 45 | AA |
|  | 1-46 | 46 | AA |
|  | 1-47 | 47 | AA |
|  | 1-48 | 48 | AA |
|  | 1-49 | 49 | AA |
|  | 1-50 | 50 | AA |
| Reference Example | 1-1 | 51 | AA |
|  | 1-2 | 52 | AA |
|  | 1-3 | 53 | AA |
|  | 1-4 | 54 | AA |
| Comparative Example | 1-1 | 55 | C |
|  | 1-2 | 56 | B |
|  | 1-3 | 57 | B |
|  | 1-4 | 58 | C |
|  | 1-5 | 59 | B |
|  | 1-6 | 60 | C |

(Evaluation of Compatibility of Gloss Brightness and Gloss Clarity)

The pigment ink (high concentration ink or medium concentration ink) was combined with each clear ink so as to be shown in Table 7 to prepare ink sets. Patterns respectively containing the following 5-cm by 5-cm solid images (1) to (4) were then recorded on a recording medium (OHP film, CG3410; product of Sumitomo 3M Limited) by the above-described ink jet recording apparatus. At this time, the pigment ink and the clear ink were set at positions of a magenta ink and a green ink in a cartridge holder, respectively, and the clear ink was applied so as to overlap the pigment ink after the pigment ink was applied to conduct recording by 8-pass one-way recording.

(1) Recording duty of pigment ink: 0%, and recording duty of clear ink: 40%, (2) Recording duty of pigment ink: 40%, and recording duty of clear ink: 40%, (3) Recording duty of pigment ink: 80%, and recording duty of clear ink: 20%, and (4) Recording duty of pigment ink: 80%, and recording duty of clear ink: 40%.

After the images obtained above were stored for 24 hours at ordinary temperature, the 20° gloss values in the regions of the 4 images were measured by means of a micro-haze meter (manufactured by BYK-Gardner) (gloss brightness). The gloss C value (%) was determined under conditions of a measuring angle of 60° and an optical comb width of 2.0 mm using a gloss clarity meter ICM-1T (manufactured by Suga Test Instruments Co., Ltd.). Compatibility of gloss brightness and gloss clarity was then evaluated from the 20° gloss value and the C value (%) measured in this manner.

The evaluation criteria for a set of the clear ink and the high concentration ink are as follows. The evaluation results are shown in Table 7. In the present invention, 'B' or more in the following evaluation criteria was regarded as an allowable level of gloss brightness and gloss clarity.

AA: Satisfying both of the following (I) and (II): (I) the C value was 45% or more in the 4 images; and (II) the 20° gloss value was 55 or more in the 4 images, A: Satisfying both of the following (I) and (II): (I) the C value was 45% or more in 2 or 3 images, and the C value was 40% or more and less than 45% in 2 or 1 image; and (II) the 20° gloss value was 55 or more in the 4 images, B: Satisfying both of the following (I) and (II): (I) the C value was 45% or more in 2 or 3 images, and the C value was 40% or more and less than 45% in 2 or 1 image; and (II) the 20° gloss value was 55 or more in 2 or 3 images, and C: Corresponding to at leas one of the following (I), (II) and (III): (I) no image had a C value of 45% or more; (II) the C value was less than 40% in at leas one image; and (III) the 20° gloss value was less than 55 in 3 or more images.

The evaluation criteria as to a set of the clear ink and the medium concentration ink are as follows. The evaluation results are shown in Table 7. In the present invention, 'B' or more in the following evaluation criteria was regarded as an allowable level of gloss brightness and gloss clarity.

AA: Satisfying both of the following (I) and (II): (I) the C value was 55% or more in the 4 images; and (II) the 20° gloss value was 65 or more in the 4 images, A: Satisfying both of the following (I) and (II): (I) the C value was 55% or more in 2 or 3 images, and the C value was 45% or more and less than 55% in 2 or 1 image; and (II) the 20° gloss value was 65 or more in the 4 images, B: Satisfying both of the following (I) and (II): (I) the C value was 55% or more in 2 or 3 images, and the C value was 45% or more and less than 55% in 2 or 1 image; and (II) the 20° gloss value was 65 or more in 2 or 3 images, and C: Corresponding to at leas one of the following (I), (II) and (III): (I) no image had a C value of 55% or more; (II) the C value was less than 45% in at leas one image; and (III) the 20° gloss value was less than 65 in 3 or more images.

TABLE 7

Evaluation results of compatibility of gloss brightness and gloss clarity

|  |  | Clear ink number | Pigment ink number (high concentration ink) | Evaluation result | Pigment ink number (medium concentration ink) | Evaluation result |
|---|---|---|---|---|---|---|
| Example | 2-1 | 1 | 1 | AA | 3 | AA |
|  | 2-2 | 2 | 1 | AA | 3 | AA |
|  | 2-3 | 3 | 1 | AA | 3 | AA |
|  | 2-4 | 4 | 1 | AA | 3 | AA |
|  | 2-5 | 5 | 1 | A | 3 | A |
|  | 2-6 | 6 | 1 | AA | 3 | AA |
|  | 2-7 | 7 | 1 | AA | 3 | AA |
|  | 2-8 | 8 | 1 | AA | 3 | AA |
|  | 2-9 | 9 | 1 | A | 3 | A |
|  | 2-10 | 10 | 1 | B | 3 | AA |
|  | 2-11 | 11 | 1 | B | 3 | A |
|  | 2-12 | 12 | 1 | B | 3 | A |
|  | 2-13 | 13 | 1 | B | 3 | AA |
|  | 2-14 | 14 | 1 | B | 3 | AA |
|  | 2-15 | 15 | 1 | B | 3 | A |
|  | 2-16 | 16 | 1 | AA | 3 | AA |
|  | 2-17 | 17 | 1 | AA | 3 | AA |
|  | 2-18 | 18 | 1 | AA | 3 | AA |
|  | 2-19 | 19 | 1 | A | 3 | A |
|  | 2-20 | 20 | 1 | AA | 3 | AA |
|  | 2-21 | 21 | 1 | AA | 3 | AA |
|  | 2-22 | 22 | 1 | A | 3 | A |
|  | 2-23 | 23 | 1 | A | 3 | A |
|  | 2-24 | 24 | 1 | AA | 3 | AA |
|  | 2-25 | 25 | 1 | AA | 3 | AA |
|  | 2-26 | 26 | 1 | AA | 3 | AA |
|  | 2-27 | 27 | 1 | A | 3 | A |
|  | 2-28 | 28 | 1 | B | 3 | B |
|  | 2-29 | 29 | 1 | A | 3 | A |
|  | 2-30 | 30 | 1 | A | 3 | A |
|  | 2-31 | 31 | 1 | A | 3 | A |
|  | 2-32 | 32 | 1 | B | 3 | B |
|  | 2-33 | 33 | 1 | A | 3 | A |
|  | 2-34 | 34 | 1 | A | 3 | A |
|  | 2-35 | 35 | 1 | A | 3 | A |
|  | 2-36 | 36 | 1 | A | 3 | A |
|  | 2-37 | 37 | 1 | A | 3 | A |
|  | 2-38 | 38 | 1 | A | 3 | A |
|  | 2-39 | 39 | 1 | B | 3 | B |
|  | 2-40 | 40 | 1 | A | 3 | A |
|  | 2-41 | 41 | 1 | A | 3 | A |
|  | 2-42 | 42 | 1 | B | 3 | B |
|  | 2-43 | 43 | 1 | B | 3 | B |
|  | 2-44 | 44 | 1 | A | 3 | A |
|  | 2-45 | 45 | 1 | AA | 3 | AA |

TABLE 7-continued

Evaluation results of compatibility of gloss brightness and gloss clarity

|  |  | Clear ink number | Pigment ink number (high concentration ink) | Evaluation result | Pigment ink number (medium concentration ink) | Evaluation result |
|---|---|---|---|---|---|---|
|  | 2-46 | 46 | 1 | A | 3 | A |
|  | 2-47 | 1 | 2 | AA | 4 | AA |
|  | 2-48 | 1 | 7 | AA | 9 | AA |
|  | 2-49 | 1 | 8 | AA | 10 | AA |
|  | 2-50 | 47 | 1 | AA | 3 | AA |
|  | 2-51 | 47 | 2 | AA | 4 | AA |
|  | 2-52 | 47 | 7 | AA | 9 | AA |
|  | 2-53 | 47 | 8 | AA | 10 | AA |
|  | 2-54 | 48 | 1 | AA | 3 | AA |
|  | 2-55 | 49 | 1 | AA | 3 | AA |
|  | 2-56 | 50 | 1 | AA | 3 | AA |
| Ref. Example | 2-1 | 51 | 1 | B | 3 | B |
|  | 2-2 | 52 | 1 | C | 3 | C |
|  | 2-3 | 53 | 1 | B | 3 | B |
|  | 2-4 | 54 | 1 | C | 3 | C |
| Comp. Example | 2-1 | 55 | 1 | B | 3 | B |
|  | 2-2 | 56 | 1 | C | 3 | C |
|  | 2-3 | 57 | 1 | B | 3 | B |
|  | 2-4 | 58 | 1 | B | 3 | B |
|  | 2-5 | 59 | 1 | C | 3 | C |
|  | 2-6 | 60 | 1 | C | 3 | C |

Incidentally, the evaluation results of Examples 2-47 and 2-49 were somewhat poorer than those with 'AA' ranks. The evaluation results of Examples 2-55 and 2-56 were somewhat poorer than those of Examples 2-50 and 2-54, respectively.

(Evaluation of Uniformity of Gloss Brightness)

The pigment inks (high concentration ink and low concentration (light) ink) were combined with each clear ink so as to be shown in Table 8 to prepare ink sets. Patterns respectively containing the following 2-cm by 2-cm solid images (1) and (2) were then recorded on a recording medium (Canon Photo Paper•Gloss Gold GL-101; product of Canon Inc.) by the above-described ink jet recording apparatus. At this time, the pigment inks and the clear ink were set at positions of a magenta ink and a green ink in a cartridge holder, respectively, and the clear ink was applied so as to overlap the pigment inks after the pigment inks were applied to conduct recording by 8-pass one-way recording.

(1) Recording duty of pigment ink (high concentration ink): 50%, and recording duty of clear ink: 10%, (2) Recording duty of pigment ink (low concentration ink): 50%, and recording duty of clear ink: 30%.

After the images obtained above were stored for 24 hours at ordinary temperature, the 20° gloss value in the image of (1), and the 20° gloss value and the haze value in the region of the image of (2) were measured by means of a micro-haze meter (manufactured by BYK-Gardner Co.). The difference between the 20° gloss values in the images of (1) and (2) was found to regard the absolute value thereof as a Δ20° gloss value. Uniformity of gloss brightness was evaluated from the Δ20° gloss value and the haze value measured in this manner. The evaluation criteria as to the uniformity of gloss brightness are as follows. The evaluation results are shown in Table 8. In the present invention, B or more in the following evaluation criteria was regarded as an allowable level of uniformity of gloss brightness.

AA: The Δ20° gloss value was less than 10, and the haze value was less than 30,

A: The Δ20° gloss value was 10 or more and less than 15, and the haze value was less than 30, B: The Δ20° gloss value was 15 or more and less than 20, and the haze value was less than 30, and C: The Δ20° gloss value was 20 or more, or the haze value was 30 or more.

TABLE 8

Evaluation results of uniformity of gloss brightness

|  |  | Clear ink number | Pigment ink number. (high concentration ink) | Pigment ink number. (low concentration ink) | Evaluation result |
|---|---|---|---|---|---|
| Example | 3-1 | 1 | 1 | 5 | AA |
|  | 3-2 | 2 | 1 | 5 | AA |
|  | 3-3 | 3 | 1 | 5 | AA |
|  | 3-4 | 4 | 1 | 5 | AA |
|  | 3-5 | 5 | 1 | 5 | AA |
|  | 3-6 | 6 | 1 | 5 | AA |
|  | 3-7 | 7 | 1 | 5 | AA |
|  | 3-8 | 8 | 1 | 5 | AA |
|  | 3-9 | 9 | 1 | 5 | A |
|  | 3-10 | 10 | 1 | 5 | AA |
|  | 3-11 | 11 | 1 | 5 | A |
|  | 3-12 | 12 | 1 | 5 | A |
|  | 3-13 | 13 | 1 | 5 | AA |
|  | 3-14 | 14 | 1 | 5 | AA |
|  | 3-15 | 15 | 1 | 5 | A |
|  | 3-16 | 16 | 1 | 5 | B |
|  | 3-17 | 17 | 1 | 5 | A |
|  | 3-18 | 18 | 1 | 5 | AA |
|  | 3-19 | 19 | 1 | 5 | AA |
|  | 3-20 | 20 | 1 | 5 | B |
|  | 3-21 | 21 | 1 | 5 | A |
|  | 3-22 | 22 | 1 | 5 | A |
|  | 3-23 | 23 | 1 | 5 | A |
|  | 3-24 | 24 | 1 | 5 | AA |
|  | 3-25 | 25 | 1 | 5 | AA |
|  | 3-26 | 26 | 1 | 5 | A |
|  | 3-27 | 27 | 1 | 5 | A |
|  | 3-28 | 28 | 1 | 5 | AA |
|  | 3-29 | 29 | 1 | 5 | AA |
|  | 3-30 | 30 | 1 | 5 | AA |
|  | 3-31 | 31 | 1 | 5 | A |
|  | 3-32 | 32 | 1 | 5 | B |
|  | 3-33 | 33 | 1 | 5 | A |

TABLE 8-continued

Evaluation results of uniformity of gloss brightness

|  | Clear ink number | Pigment ink number. (high concentration ink) | Pigment ink number. (low concentration ink) | Evaluation result |
|---|---|---|---|---|
|  | 3-34 | 34 | 1 | 5 | A |
|  | 3-35 | 35 | 1 | 5 | A |
|  | 3-36 | 36 | 1 | 5 | A |
|  | 3-37 | 37 | 1 | 5 | A |
|  | 3-38 | 38 | 1 | 5 | A |
|  | 3-39 | 39 | 1 | 5 | A |
|  | 3-40 | 40 | 1 | 5 | A |
|  | 3-41 | 41 | 1 | 5 | AA |
|  | 3-42 | 42 | 1 | 5 | A |
|  | 3-43 | 43 | 1 | 5 | A |
|  | 3-44 | 44 | 1 | 5 | A |
|  | 3-45 | 45 | 1 | 5 | AA |
|  | 3-46 | 46 | 1 | 5 | AA |
|  | 3-47 | 1 | 2 | 6 | AA |
|  | 3-48 | 1 | 7 | 11 | AA |
|  | 3-49 | 1 | 8 | 12 | AA |
|  | 3-50 | 47 | 1 | 5 | AA |
|  | 3-51 | 47 | 2 | 6 | AA |
|  | 3-52 | 47 | 7 | 11 | AA |
|  | 3-53 | 47 | 8 | 12 | AA |
|  | 3-54 | 48 | 1 | 5 | AA |
|  | 3-55 | 49 | 1 | 5 | AA |
|  | 3-56 | 50 | 1 | 5 | AA |
| Ref. Example | 3-1 | 51 | 1 | 5 | B |
|  | 3-2 | 52 | 1 | 5 | C |
|  | 3-3 | 53 | 1 | 5 | B |
|  | 3-4 | 54 | 1 | 5 | C |
| Comp. Example | 3-1 | 55 | 1 | 5 | B |
|  | 3-2 | 56 | 1 | 5 | C |
|  | 3-3 | 57 | 1 | 5 | B |
|  | 3-4 | 58 | 1 | 5 | B |
|  | 3-5 | 59 | 1 | 5 | C |
|  | 3-6 | 60 | 1 | 5 | C |

Incidentally, the uniformity of gloss brightness in Examples 3-47 and 3-49 was somewhat poorer than that with 'AA' ranks. The evaluation results of Examples 3-55 and 3-56 were somewhat poorer than those of Examples 3-50 and 3-54, respectively.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-157470, filed on Jul. 2, 2009, which is hereby incorporated by reference herein in its entirety.

What is claimed is:

1. An ink jet clear ink comprising:
a polymer fine particle having a core-shell structure,
wherein a shell polymer of the core-shell structure is a copolymer comprising a unit derived from an α,β-ethylenically unsaturated hydrophobic monomer (a) and a unit derived from a monomer selected from an α,β-ethylenically unsaturated acid monomer and a salt thereof,
wherein a core polymer of the core-shell structure includes a unit derived from an α,β-ethylenically unsaturated hydrophobic monomer (b) including a monomer containing a chain structure saturated alkyl group, and
wherein the core-shell structure is obtained by polymerizing the α,β-ethylenically unsaturated hydrophobic monomer (b) in the presence of the shell polymer, which has been previously polymerized.

2. The clear ink according to claim 1, wherein the monomer containing a chain structure saturated alkyl group is a (meth)acrylic ester of a chain structure saturated aliphatic primary alcohol.

3. The clear ink according to claim 2, wherein the (meth)acrylic ester of a chain structure saturated aliphatic primary alcohol is an acrylic ester of a chain structure saturated aliphatic primary alcohol having 4 to 12 carbon atoms.

4. The clear ink according to claim 2, wherein the (meth)acrylic ester of a chain structure saturated aliphatic primary alcohol is a methacrylic ester of a chain structure saturated aliphatic primary alcohol having 1 to 4 carbon atoms.

5. The clear ink according to claim 1, wherein the polymer fine particle has an acid value of 40 mg KOH/g or more and 200 mg KOH/g or less.

6. The clear ink according to claim 1, wherein the shell polymer has an acid value of 60 mg KOH/g or more and 400 mg KOH/g or less.

7. The clear ink according to claim 1, wherein the polymer fine particle has a core/shell ratio by mass of the core polymer to the shell polymer of 0.33 or more and 1.5 or less.

8. The clear ink according to claim 1, wherein the shell polymer has a weight-average molecular weight of 3,000 or more and 50,000 or less.

9. The clear ink according to claim 1, wherein the polymer fine particle has a minimum film formation temperature of 25° C. or less.

10. The clear ink according to claim 1, wherein the monomer selected from an α,β-ethylenically unsaturated acid monomer and a salt thereof is a monomer selected from an unsaturated monomer containing a carboxylic acid group and a salt thereof.

11. The clear ink according to claim 10, wherein only the shell monomer comprises the unit derived from a monomer selected from an unsaturated monomer containing a carboxylic acid group and a salt thereof.

12. The clear ink according to claim 1, wherein the polymer fine particle has a volume-average particle size of 30 nm or more and 200 nm or less.

13. The clear ink according to claim 1, wherein a content (% by mass) of the polymer fine particle in the clear ink is 0.3% by mass or more and 5.0% by mass or less based on the total mass of the clear ink.

14. An ink jet recording method comprising:
ejecting a clear ink by an ink jet system to apply the clear ink to a recording medium,
wherein the clear ink is the clear ink according to claim 1.

15. An ink jet recording method using a clear ink and at least one pigment ink, the ink jet recording method comprising:
a step (I) of conducting recording on a recording medium with the at least one pigment ink; and
a step (II) of ejecting the clear ink by an ink jet system to apply the clear ink to the recording medium,
wherein the clear ink is the clear ink according to claim 1.

16. The ink jet recording method according to claim 15, wherein the step (I) is conducted in a region of at least a part of the recording medium, and the step (II) is then conducted.

17. An ink jet ink set comprising a clear ink and a pigment ink, wherein the clear ink according to claim 1 is used as the clear ink.

18. An ink cartridge comprising a storage portion for storing a clear ink, wherein the clear ink is the clear ink according to claim 1.

19. A recording unit comprising a storage portion for storing a clear ink and a recording head for ejecting the clear ink, wherein the clear ink is the clear ink according to claim 1.

20. An ink jet recording apparatus comprising a storage portion for storing a clear ink and a recording head for ejecting the clear ink, wherein the clear ink is the clear ink according to claim 1.

* * * * *